United States Patent
Walenta et al.

(10) Patent No.: US 11,411,722 B2
(45) Date of Patent: *Aug. 9, 2022

(54) METHOD OF OPERATION OF A QUANTUM KEY CONTROLLER

(71) Applicant: QUANTUMXCHANGE, INC., Bethesda, MD (US)

(72) Inventors: Nino Walenta, Geneva (CH); Donald T. Hayford, Columbus, OH (US); Michael A. Hagerman, Lewis Center, OH (US)

(73) Assignee: QUANTUMXCHANGE, INC., Bethesda, MD (US)

( * ) Notice: Subject to any disclaimer, the term of this patent is extended or adjusted under 35 U.S.C. 154(b) by 565 days.

This patent is subject to a terminal disclaimer.

(21) Appl. No.: 16/403,467

(22) Filed: May 3, 2019

(65) Prior Publication Data
US 2020/0351086 A1 Nov. 5, 2020

(51) Int. Cl.
*H04L 29/06* (2006.01)
*H04L 9/08* (2006.01)
*H04L 9/30* (2006.01)

(52) U.S. Cl.
CPC ............ *H04L 9/0855* (2013.01); *H04L 9/083* (2013.01); *H04L 9/0894* (2013.01); *H04L 9/30* (2013.01)

(58) Field of Classification Search
USPC .................................................. 380/278, 279
See application file for complete search history.

(56) References Cited

U.S. PATENT DOCUMENTS

| | | | |
|---|---|---|---|
| 5,768,873 | A | 6/1998 | Stiller et al. |
| 6,185,680 | B1 | 2/2001 | Shimbo |
| 7,113,598 | B2 | 9/2006 | Flusberg et al. |
| 7,178,277 | B2 | 2/2007 | Takeuchi |
| 7,181,011 | B2 | 2/2007 | Trifonov |
| 7,457,416 | B1 | 11/2008 | Elliott |

(Continued)

FOREIGN PATENT DOCUMENTS

| | | |
|---|---|---|
| EP | 3007478 | 4/2016 |
| WO | 160112086 | 7/2016 |

OTHER PUBLICATIONS

Walenta Nino et al.: "Practical aspects of security certification for commercial quantum technologies," Proceedings of SPIE, IEEE, US, vol. 9648, Oct. 13, 2015 (Oct. 13, 2015), pp. 96480U-96480U, XP060062690, DOI: 10.1117/12.2193776, ISBN: 978-1-62841-730-2, pp. 2, 8, 9; figure 4.

(Continued)

*Primary Examiner* — Amare F Tabor
(74) *Attorney, Agent, or Firm* — Womble Bond Dickinson (US) LLP

(57) ABSTRACT

A quantum communication system has a plurality of trusted nodes. Each trusted node has a quantum key controller, and a quantum transmitter or a quantum receiver. The trusted nodes are configurable as first and second endpoint trusted nodes and middle-trusted nodes between endpoint trusted nodes. The first endpoint trusted node encrypt data comprising a first key, using a first quantum key. Each middle-trusted node decrypts, using a preceding quantum key, and re-encrypts using a succeeding quantum key. The second endpoint trusted node decrypts using a quantum key, so that the first and second endpoint trusted nodes each have the first key.

20 Claims, 20 Drawing Sheets

(56) References Cited

U.S. PATENT DOCUMENTS

| | | | |
|---|---|---|---|
| 7,512,242 | B2 | 3/2009 | Pearson et al. |
| 7,646,873 | B2 * | 1/2010 | Lee .................... H04L 9/0852 380/277 |
| 7,706,535 | B1 | 4/2010 | Pearson et al. |
| 7,792,288 | B2 | 9/2010 | Kollmitzer |
| 7,889,868 | B2 | 2/2011 | Wellbrock et al. |
| 8,650,401 | B2 | 2/2014 | Wiseman et al. |
| 8,681,982 | B2 | 3/2014 | Wiseman et al. |
| 8,903,094 | B2 | 12/2014 | Bovino |
| 8,964,989 | B2 | 2/2015 | Grice |
| 9,264,225 | B1 * | 2/2016 | Hunt .................... H04L 9/0852 |
| 9,608,802 | B2 * | 3/2017 | Yuen .................... H04L 9/002 |
| 9,698,979 | B2 | 7/2017 | Armstrong et al. |
| 10,291,400 | B2 | 5/2019 | Tanizawa |
| 10,432,395 | B2 * | 10/2019 | Howe .................... H04L 9/0858 |
| 10,467,425 | B1 * | 11/2019 | Harold .................. H04L 9/0656 |
| 10,554,397 | B2 * | 2/2020 | Howe .................... H04L 63/0428 |
| 10,581,604 | B2 * | 3/2020 | Mustafa ................ H04L 9/0869 |
| 2004/0184603 | A1 | 9/2004 | Pearson |
| 2005/0286723 | A1 | 12/2005 | Vig et al. |
| 2006/0088157 | A1 * | 4/2006 | Fujii .................... H04L 9/3006 380/30 |
| 2006/0275736 | A1 | 12/2006 | Wen et al. |
| 2008/0141534 | A1 | 6/2008 | Hilliard |
| 2010/0293380 | A1 | 11/2010 | Wiseman et al. |
| 2010/0299526 | A1 | 11/2010 | Wiseman |
| 2011/0213979 | A1 | 9/2011 | Wiseman |
| 2012/0198441 | A1 | 8/2012 | Mahdavi |
| 2013/0073071 | A1 | 3/2013 | Culp |
| 2013/0083926 | A1 | 4/2013 | Hughes |
| 2014/0006793 | A1 | 1/2014 | Donovan |
| 2014/0315153 | A1 | 10/2014 | Kitching et al. |
| 2015/0236900 | A1 | 8/2015 | Chung |
| 2016/0234009 | A1 * | 8/2016 | Li .................... H04L 9/0852 |
| 2016/0248581 | A1 | 8/2016 | Fu |
| 2016/0285629 | A1 | 9/2016 | Tanizawa |
| 2018/0109377 | A1 | 4/2018 | Fu |
| 2018/0116762 | A1 | 5/2018 | Kopelman |
| 2018/0367309 | A1 | 12/2018 | Reinhold |
| 2020/0076595 | A1 | 3/2020 | Hathorn |
| 2020/0076600 | A1 | 3/2020 | Driever |
| 2020/0076807 | A1 | 3/2020 | Driever |

OTHER PUBLICATIONS

The International Search Report and Written Opinion of the International Searching Authority for PCT Application No. PCT/US2020/031155 dated Sep. 2, 2020, 10 pages.

The International Search Report and Written Opinion of the International Searching Authority for PCT Application No. PCT/US2020/030572 dated Jul. 3, 2020, 9 pages.

Aguado, Alejandro, et al. "Quantum-aware software defined networks." Int. Conf. on Quantum Cryptography (QCrypt), 2016. (Year: 2016).

Aguado, Alejandro, Victor Lopez, Jesus Martinez-Mateo, Momtchil Peev, Diego Lopez, and Vicente Martin, "Virtual Network Function Deployment and Service Automation to Provide End-to-End Quantum Encryption," J. Opt. Commun. Netw. 10, 421-430 (2018) (Year: 2018).

Aguado, Alejandro, et al. Secure NFV orchestration over an SDN-controlled optical network with time-shared quantum key distribution resources. Journal of Lighwave Technology 35.8 (2017): 1357-1362. (Year: 2017).

N. Amaya, G. S. Zervas and D. Simeonidou, "Architecture on demand for transparent optical networks," 2011 13th International Conference on Transparent Optical Networks, 2011, pp. 1-4, doi: 10.1109/ICTON.2011.5970836. (Year 2011).

Y. Cao et al., "Experimental Demonstration of End-to-End Key on Demand Service Provisioning Over Quantum Key Distribution Networks with Software Defined Networking," 2019 Optical Fiber Communications Conference and Exhibition (OFC), 2019, pp. 1-3. (Year: 2019).

Tysowski, Piotr K., et al. "The engineering of a scalable multi-site communications system utilizing quantum key distribution (QKD)." Quantum Science and Technology 3.2 (2018): 024001. (Year: 2018).

Final Office Action dated Dec. 21, 2021 for U.S. Appl. No. 16/403,462, 9 pages.

Non-Final Office Action dated Jun. 18, 2021 for U.S. Appl. No. 16/403,462, 7 pages.

Non-Final Office Action dated Jun. 9, 2021 for U.S. Appl. No. 16/403,474, 21 pages.

Final Office Action dated Jan. 18, 2022 for U.S. Appl. No. 16/403,474, 26 pages.

The International Search Report of the International Searching Authority for PCT Application No. PCT/US2020/030889 dated Jul. 13, 2020, 4 pages.

The Written Opinion of the International Searching Authority for PCT Application No. PCT/US2020/030889 dated Jul. 13, 2020, 7 pages.

The International Preliminary Report on Patentability of the International Searching Authority for PCT Application No. PCT/US2020/030889 dated Nov. 2, 2021, 8 pages.

The International Preliminary Report on Patentability of the International Searching Authority for PCT Application No. PCT/US2020/031155 dated Nov. 2, 2021, 7 pages.

The International Preliminary Report on Patentability of the International Searching Authority for PCT Application No. PCT/US2020/046150 dated Feb. 8, 2022, 7 pages.

Mink, Alan et al., "Quantum Key Distribution (QKD) and Commodity Security Protocols: Introduction and Integration," International Journal of Network Security & Its Applications (IJNSA), Jul. 1, 2009 (Jul. 1, 2009), XP055539157, retrieved from the Internet: URL: http://airccse.org/journal/nsa/0709s9.pdf [retrieved on Jan. 8, 2019].

Dijkstra, E.W., "A Note on Two Problems in Connexion with Graphs," Numerische Mathematik, Jun. 11, 1959, pp. 269-271, vol. 1, Amsterdam.

ETSI QKD Industry Specification Group, Sep. 24, 2015, <https://web.archive.org/web/20150924015201/http://www.etsi.org/technologies-clusters/technologies/quantum-key-distribution>.

Gisin, et al., "Quantum cryptography," Reviews of Modern Physics, Jan. 2002, pp. 145-195, vol. 74, The American Physical Society.

Hughes, et al., "Network-Centric Quantum Communications with Application to Critical Infrastructure Protection," 2013.

Langer, et al., "Standardization of quantum key distribution and the ETSI standardization initiative ISG-QKD," New Journal of Physics, Jan. 26, 2009, 17 pgs., vol. 11, IOP Publishing Ltd and Deutsche Physikalische Gesellschaft.

Peev, et al., "The SECOQC quantum key distribution network in Vienna," New Journal of Physics, Mar. 25, 2009, 38 pgs., vol. 11.

Sasaki, et al., "Field test of quantum key distribution in the Tokyo QKD Network," Optics Express, May 23, 2011, pp. 10387-10409, vol. 19, No. 11.

Stucki, et al., "Long-term performance of the SwissQuantum quantum key distribution network in a field environment," New Journal of Physics, Dec. 1, 2011, 19 pgs., vol. 13, IOP Publishing Ltd and Deutsche Physikalische Gesellschaft.

Walenta, et al., "A fast and versatile quantum key distribution system with hardware key distillation and wavelength multiplexing," New Journal of Physics, Jan. 23, 2014, 21 pgs., vol. 16, IOP Publishing Ltd and Deutsche Physikalische Gesellschaft.

Walenta, et al., "Towards a North American QKD Backbone with Certifiable Security," QCrypt2015, 5th International Conference on Quantum Cryptography, Sep. 28, 2015, 3 pgs., Tokyo, Japan, Abstract only.

Walenta, et al., "Towards a North American QKD Backbone with Certifiable Security," QCrypt2015, 5th International Conference on Quantum Cryptography, Sep. 28, 2015, 15 pgs., Tokyo, Japan, Slides only.

Walenta, et al., "Towards a North American QKD Backbone with Certifiable Security," QCrypt2015, 5th International Conference on Quantum Cryptography, Sep. 28, 2015, Tokyo, Japan, Screen grab only. <https://www.youtube.com/watch?v=P1MYAOgLLx0>.

(56) References Cited

OTHER PUBLICATIONS

Wang, et al., "Field and long-term demonstration of a wide area quantum key distribution network," Optics Express, Sep. 8, 2014, 18 pgs., vol. 22, No. 18.

* cited by examiner

METHOD OF OPERATION OF A QUANTUM KEY CONTROLLER

FIELD OF USE

The present embodiments relate to the field of quantum key distribution.

BACKGROUND

Quantum Key Distribution (QKD) uses principles of quantum mechanics for secure communication of cryptographic keys, called quantum keys. Distribution of quantum keys occurs over a quantum channel, between a quantum transmitter and a quantum receiver using photons or particles, for example photons in phase modulation, polarization, quantum superposition or quantum entanglement with information transmitted in quantum states. Eavesdropping in the quantum channel, to intercept a key by a hostile third-party, is detectable because measurement of the photon or particle collapses the quantum state and disturbs the quantum system. Existing, practical Quantum Key Distribution systems are limited to about 60 miles or 100 kilometers because of attenuation over practical media such as fiber optics for photons. It is a goal of presently described embodiments to increase the distance over which a key can be distributed using Quantum Key Distribution. It is a further goal of presently described embodiments to improve secure communication technology. It is a still further goal of presently described embodiments to improve security of keys inside nodes of a system.

SUMMARY

A quantum communication system, a quantum key distribution system, and a component for a quantum communication system are disclosed, among further embodiments.

The quantum communication system has a plurality of trusted nodes. Each trusted node has a quantum key controller and at least a quantum transmitter or a quantum receiver. Two of the plurality of trusted nodes are configurable as first and second endpoint trusted nodes. Remaining ones of the plurality of trusted nodes are configurable as middle-trusted nodes between the endpoint trusted nodes. The first endpoint trusted node and a first one of the middle-trusted nodes exchange a first quantum key. The first endpoint trusted node encrypts data comprising a first key, using the first quantum key. The first endpoint trusted node transmits the first quantum key encrypted data comprising the first key, over a network to the first one of the middle-trusted nodes.

Each of the middle-trusted nodes decrypts the data comprising the first key that is encrypted using a preceding quantum key. The preceding trusted node and the middle-trusted node exchange the preceding quantum key. The middle-trusted node decrypts, using the preceding quantum key. The middle-trusted node and a succeeding trusted node exchange a succeeding quantum key. The middle-trusted node re-encrypts the data comprising the first key. The re-encryption uses the succeeding quantum key. The middle-trusted node transmits the data comprising the first key, encrypted using the succeeding key, over the network to the succeeding trusted node.

The second endpoint trusted node and a second one of the middle-trusted nodes exchange a second quantum key. The second endpoint trusted node receives the data comprising the first key, encrypted using the second quantum key, over the network and decrypts, using the second quantum key. The second endpoint trusted node obtains the first key, so that the first and second endpoint trusted nodes each has the first key.

A quantum key distribution has a plurality of trusted nodes. Each trusted node has a quantum key controller with at least a quantum transmitter or a quantum receiver. A first endpoint trusted node and a second endpoint trusted node exchange a first public key with each other. The first endpoint trusted node transmits a first quantum key over a first quantum channel to a first middle-trusted node. The first middle-trusted node is one of one or more middle-trusted nodes of the plurality of trusted nodes. The middle-trusted nodes are between the first endpoint trusted node and the second endpoint trusted node.

The first endpoint trusted node combines a first key with the first public key to form a once encrypted key. The first endpoint trusted node encrypts the once encrypted key with a quantum enhanced key. The quantum enhanced key is based on the first quantum key. This forms a twice encrypted key. The first endpoint trusted node transmits the twice encrypted key over a network to the first middle-trusted node.

Each of the one or more middle-trusted nodes receives a quantum key over a quantum channel from a preceding trusted node. The middle-trusted node transmits a further quantum key over a further quantum channel to the following trusted node. The middle-trusted node receives a corresponding twice encrypted key over the network from the preceding trusted node. The middle-trusted node decrypts the corresponding twice encrypted key with the quantum key, to form the once encrypted key. The middle-trusted node re-encrypts the once encrypted key with the further quantum key, to form a further twice encrypted key. The middle-trusted node transmits the further twice encrypted key over the network to the following trusted node.

The second endpoint trusted node receives the further quantum key over the further quantum channel from a final one of the middle-trusted nodes. The second endpoint trusted node is received the twice encrypted key over the network from the final middle-trusted node. The second endpoint trusted node decrypts the twice encrypted key with the further quantum key, to form the once encrypted key. The second endpoint trusted node extracts, using the first public key, the first key from the once encrypted key. Then, the first endpoint trusted node and the second endpoint trusted node each have the first key.

A component for a quantum communication system includes a trusted node. The trusted node is configurable as a first endpoint trusted node, a middle-trusted node and a second endpoint trusted node. The trusted node has a quantum key controller. A plurality of trusted nodes, configured as the first endpoint trusted node, the second endpoint trusted node and one or more middle-trusted nodes are able to form the quantum communication system.

With the trusted node as the first endpoint trusted node, the quantum key controller directs a quantum transmitter to exchange a first quantum key between the trusted node and a trusted node that succeeds the first endpoint trusted node. The quantum key controller encrypts data comprising a first key using the first quantum key. The quantum key controller transmits the data comprising the first key encrypted using the first quantum key, to the trusted node that succeeds the first endpoint trusted node, over a network.

With the trusted node as the middle-trusted node, the quantum key controller directs a quantum receiver to exchange a preceding quantum key with a trusted node that precedes the middle-trusted node. The quantum key controller directs a quantum transmitter to exchange a succeeding quantum key with a trusted node that succeeds the middle-trusted node. The quantum key controller decrypts, using the preceding quantum key, the data comprising the first key encrypted using the preceding quantum key. The quantum key controller re-encrypts, using the succeeding quantum key, the data comprising the first key. The quantum key controller transmits the data comprising the first key encrypted using the succeeding quantum key to a trusted node that succeeds the middle-trusted node, over the network.

With the trusted node as the second endpoint trusted node, the quantum key controller directs a quantum receiver to exchange a second quantum key with a trusted node that precedes the second endpoint trusted node. The quantum key controller receives from the network and decrypts, using the second quantum key, the data comprising the first key encrypted using the second quantum key. The quantum key controller obtains the first key, so that the first endpoint trusted node and the second endpoint trusted node each have the first key.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A system described herein uses Quantum Key Distribution for key exchange between neighboring nodes, and a series of hops of encryption, decryption and re-encryption using quantum keys, to send another key from one end point to another endpoint over the series of hops from node to node. The key so transmitted can thus be sent much greater distance than would be possible for a single key exchange in a Quantum Key Distribution limited by the maximum coherence distance of a quantum channel. This key is then used at either end point to encrypt or decrypt data that is sent so encrypted over a regular network, such as the Internet. Quantum communication is thus greatly extended, with the encrypted data benefiting from the speed and efficiency of regular network communication and benefiting from the security of Quantum Key Distribution while not being limited to the distance of a quantum channel. System architecture protects the quantum keys from unauthorized access.

Figure 1A:
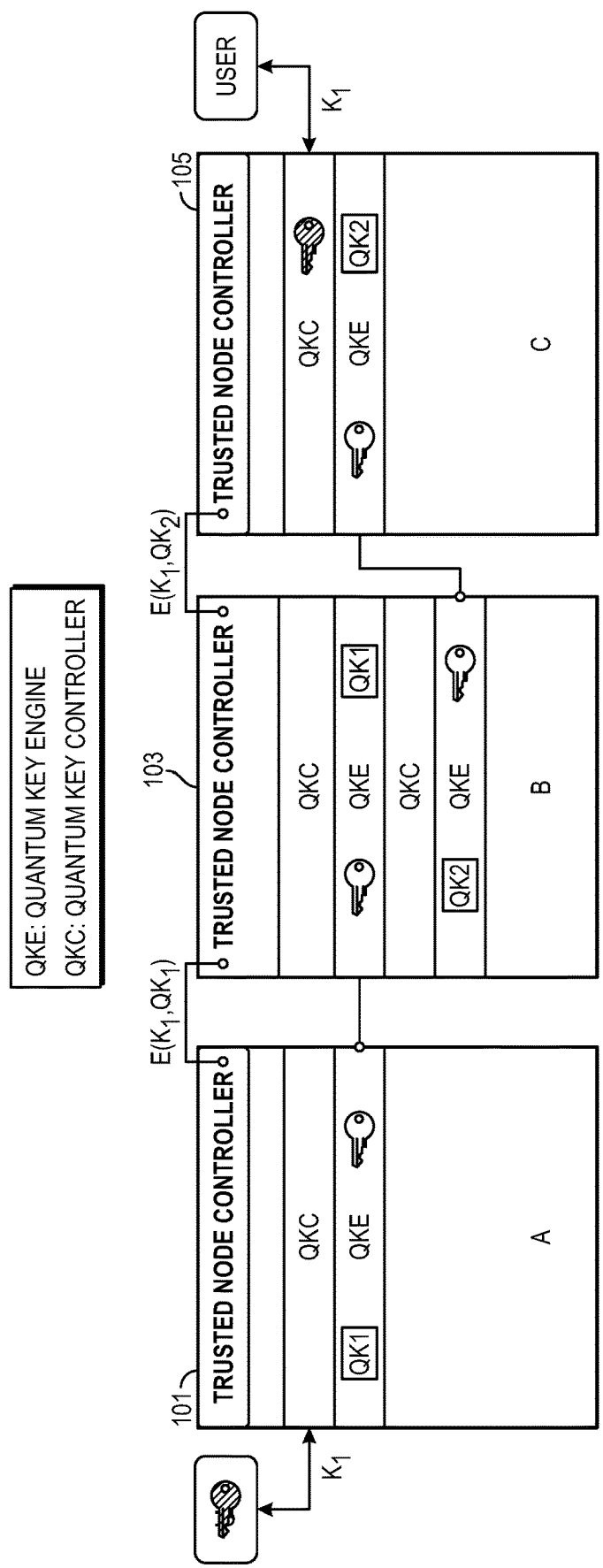
FIG. 1A illustrates a Quantum Key Distribution system in accordance with present embodiments.

FIG. 1A illustrates a Quantum Key Distribution system in accordance with present embodiments. A number of Trusted Nodes 101, 103, 105 are coupled together in a network. Each two neighboring Trusted Nodes (e.g., Trusted Node pair 101, 103 and Trusted Node pair 103, 105) are separated by less than or equal to a maximum specified distance over which quantum communication is reliable (for example, 100 km or 60 miles, possibly increased in further versions) for each communication hop. The Trusted Nodes perform Quantum Key Distribution among neighboring nodes over a regular network. Each Trusted Node 101, 103, 105 has a Trusted Node Controller, one or more Quantum Key Controllers (QKC) and one or more Quantum Key Engines (QKE). Quantum key engines of neighboring Trusted Nodes use a quantum channel or quantum link, for example fiber-optic cable, to exchange quantum keys, which are used to encrypt data exchanged by Trusted Nodes.

In some embodiments, Quantum Key Engines generate keys continuously. Keys are transferred securely to Quantum Key Controllers. The Quantum Key Controller handles security (tamper detection, erasing or deleting keys also called key zeroization), encrypting user keys with quantum keys and decrypting using quantum keys. The Trusted Node Controller handles routing, transfer of key-encrypted keys to other Trusted Nodes, and higher-level protocols. But, in this embodiment to prevent the Trusted Node Controller from having access to all of the keys in the Trusted Node and thereby having a vulnerability, the Trusted Node Controller directs Quantum Key Controllers and Quantum Key Engines to handle keys and the Trusted Node Controller never sees or handles a quantum key directly or in unencrypted form. This arrangement keeps keys for one user, client or tenant provably separated from keys of other users, clients or tenants.

Using these mechanisms, the Quantum Key Distribution system of FIG. 1A passes a key, which could be a public key, private key, quantum key or other key, and could be unencrypted plain text, combined, in encrypted form or other form, from one end to the other end in an end-to-end key passing mechanism. In various versions, K1, K1 encrypted by a public key PK, K1 encrypted by a pre-shared key PSK, K1 encrypted by another key, K1 XOR or otherwise combined with another key or data, etc., is treated as data that includes key K1. This data that includes key K1 is encrypted by a quantum key at one trusted node, decrypted by the same quantum key at the next trusted node, re-encrypted with the next quantum key and sent to the next trusted node. This can be repeated for any number of hops of trusted nodes. At the final trusted node, the quantum key encrypted data that includes key K1 is decrypted by quantum key to recover the data that includes key K1. An example is described below. This chain of hops with decryption and re-encryption is extensible as shown in FIGS. 1B and 1C.

In the first Trusted Node Controller 101 labeled "A", a key K1 (diagonal line shading) is encrypted using a quantum key QK1 (no shading) that the Quantum Key Engine in the first Trusted Node 101 has exchanged with a Quantum Key Engine in the second Trusted Node 103. The quantum key encrypted key K1 (e.g., K1 in some form encrypted by QK1, denoted (E(K1, QK1)) is communicated from the first Trusted Node 101 to the second Trusted Node 103 by a network. In the second Trusted Node 103 labeled "B", this encrypted value is decrypted using the quantum key QK1, to produce key K1 in the appropriate form, then re-encrypted using the quantum key QK2 (no shading) that another Quantum Key Engine in the second Trusted Node 103 has exchanged with a Quantum Key Engine in the third Trusted Node 105. This quantum key encrypted key K1 (e.g., K1 in some form encrypted by QK2, denoted (E(K1, QK2)) is communicated over a network from the second Trusted Node 103 to the third Trusted Node 105 labeled "C". In the third Trusted Node 105, this encrypted value is decrypted by a Quantum Key Engine using the quantum key QK2, to obtain the key K1. Both ends have the key K1, as communicated from end to end using quantum keys. Other data besides keys could be communicated the same way in further embodiments (see FIG. 1B). And, there is a more efficient way of communicating data (see FIG. 1C), once both endpoints have a key that has been communicated using quantum keys and Quantum Key Distribution.

Figure 1B:
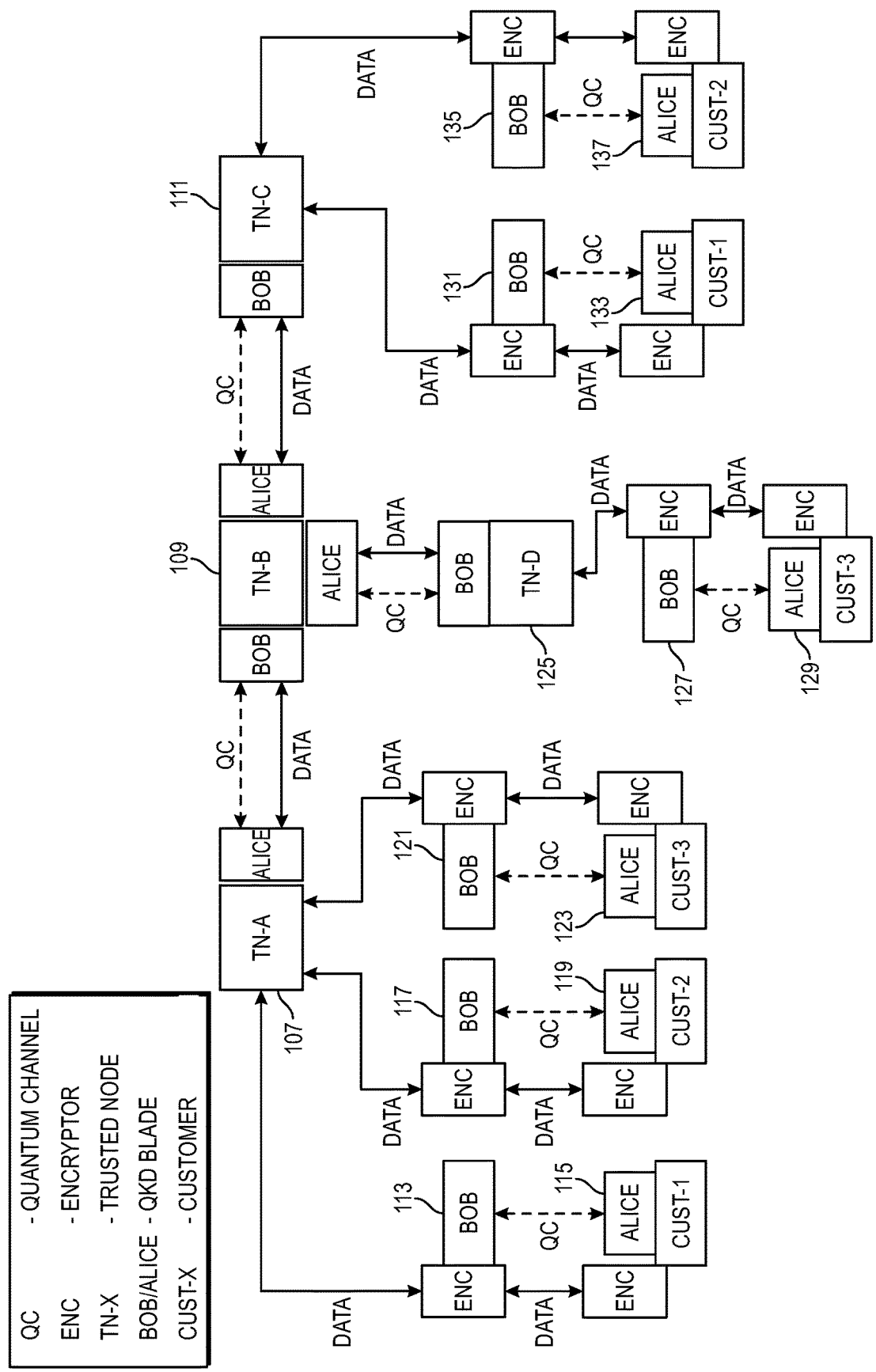
FIG. 1B illustrates a quantum communication network featuring Quantum Key Distribution by a Quantum Key Distribution system in accordance with present embodiments.
Figure 1C:
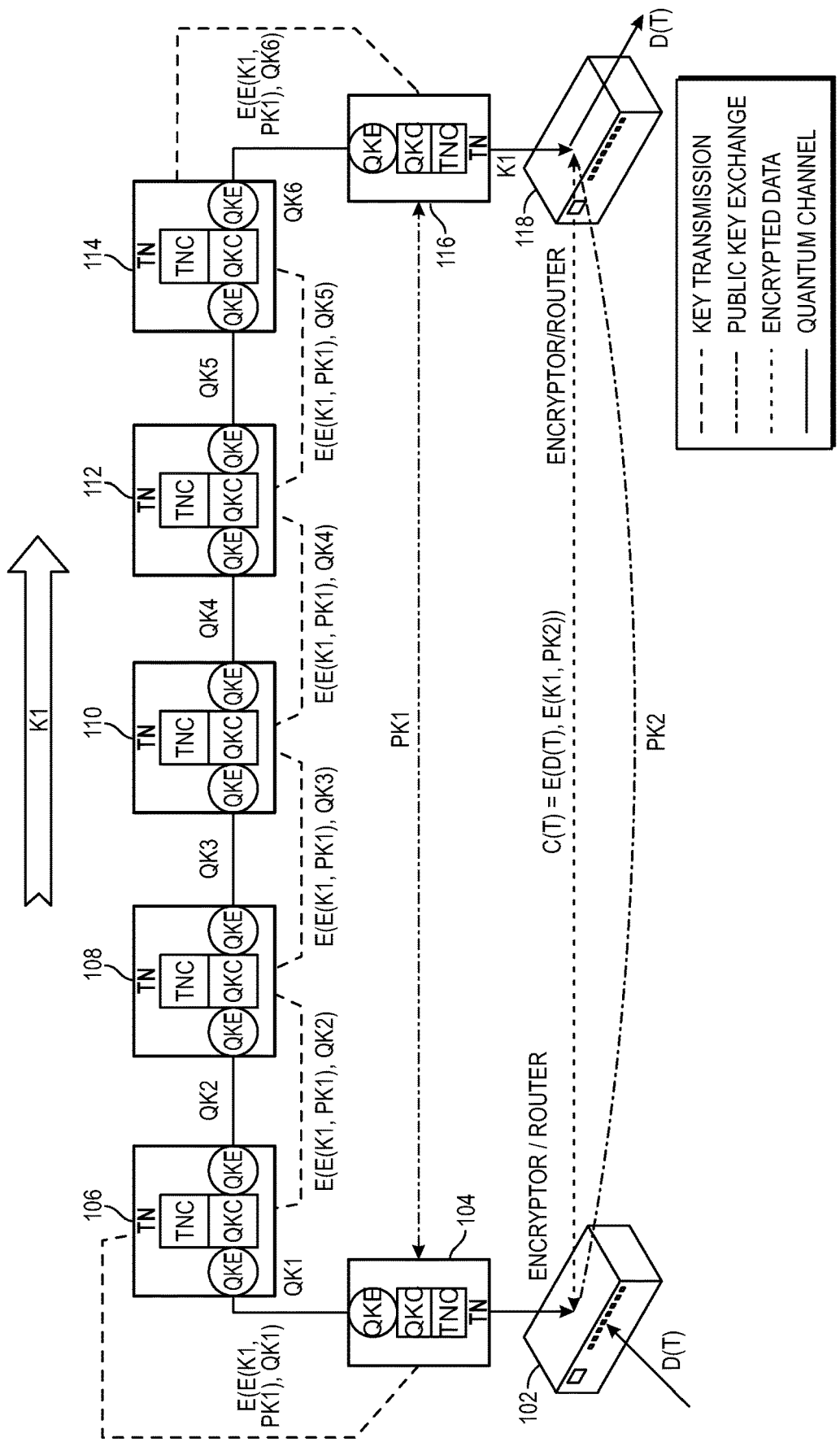
FIG. 1C illustrates a quantum key encrypted data system, or more broadly a quantum communication network including a Quantum Key Distribution system, exchanging quantum keys via quantum channels and communicating encrypted data via a network, in accordance with present embodiments.

FIG. 1B illustrates a quantum communication network featuring Quantum Key Distribution by a Quantum Key Distribution system in accordance with present embodiments. This is an example of a Trusted Node connection architecture, and further examples with other connections and numbers of Trusted Nodes, etc., are readily devised. Three Trusted Nodes 107, 109, 111 are coupled to each other similarly to the Quantum Key Distribution system in FIG. 1A, and are also coupled to or include further Alice and Bob modules and encryptors, for a multitenant system. Users representing various customers, alternatively termed tenants, can communicate data over paths protected by quantum communication. This system can handle multiple tenants per node. And, the system can handle multiple nodes per tenant, for example passing communication across multiple nodes between two users for that tenant. The system could disconnect a customer node, move customers relative to nodes, and differentiate which communication goes to which node and for which customer.

"Alice" is the name commonly given to a quantum transmitter, and "Bob" is the name commonly given to a quantum receiver. Each pair of neighboring Alice and Bob modules, e.g. Alice 115 and Bob 113, Alice 119 and Bob 117, Alice 123 and Bob 121, Alice 129 and Bob 127, Alice 133 and Bob 131, Alice 137 and Bob 135, Alice of Trusted Node 107 labeled "TN-a" and Bob of Trusted Node 109 labeled "TN-b", Alice of Trusted Node 109 and Bob of Trusted Node 125 labeled "TN-d", and Alice of Trusted Node 109 and Bob of Trusted Node 111 labeled "TN-c", has a quantum channel QC and can exchange a quantum key specific to that pair. Encryptors associated with those Alice and Bob modules of a pair can encrypt and decrypt data, using the quantum key shared by that pair.

Continuing with the example in FIG. 1B, a user representing customer 1 (Cust-1) has the Alice module 115 cooperate with the encryptor to encrypt data using the quantum key exchanged with the neighboring Bob module 113. The Bob module 113 works with the encryptor to decrypt the data, which is then communicated to the Trusted Node 107 TN-a. Trusted node 107 encrypts the data using the quantum key exchanged between the Alice module of the Trusted Node 107 and the Bob module of the Trusted Node 109, TN-b. At the Trusted Node 109 TN-b, the Bob module decrypts the data using the quantum key exchanged between that Bob module and the preceding Alice module (of Trusted Node 107 TN-a), and an Alice module of the Trusted Node 109 TN-b re-encrypts the data using the quantum key exchanged between that Alice module and the Bob module of the succeeding or following Trusted Node 111 TN-c. That Trusted Node 111 TN-c hands the data to the encryptor and Bob module 131, where the data is encrypted using the quantum key exchanged between that Bob module 131 and the succeeding Alice module 133. That quantum key encrypted data is communicated to the next encryptor and decrypted with the cooperation of the Alice module 133 and the quantum key shared with the preceding Bob module 131.

Another user for customer 1 (Cust-1) can then access the decrypted data. Users for customer 1 can readily transmit data in the reverse direction, using the same quantum key encryption/decryption process and passed in the reverse of the direction described above. Users for customer 2 can communicate data over related paths, in both directions, as can users for customer 3. For example, the users for customer 2 communicate over a path defined by the Alice module 119, Bob module 117, Trusted Node 107, Trusted Node 109, Trusted Node 111, Bob module 135 and Bob module 137, in either direction. The users for customer 3 communicate over a path defined by the Alice module 123, Bob module 121, Trusted Node 107, Trusted Node 109, Bob module of Trusted Node 125 TN-d, Bob module 127 and Alice module 129.

In the example of FIG. 1B, each of the Alice and Bob modules is in a corresponding blade, an Alice blade or a Bob blade. Data can be communicated between blades encrypted by a quantum key, encrypted by another key such as a shelf key used among blades on a shelf in a Trusted Node, or encrypted by another key. In some embodiments, data communicated between or among modules is always encrypted by some key, be it a quantum key or a shelf key, so that plain text data is never visible on an inter-module bus or network connection. However, in further embodiments, it is possible that data could be communicated in plain text form between modules.

FIG. 1C illustrates a quantum key encrypted data system, or more broadly a quantum communication network including a Quantum Key Distribution system, exchanging quantum keys via quantum channels and communicating encrypted data via a network, in accordance with present embodiments. Enclosures for various components in this and other embodiments are not shown but readily devised. The system uses a number of Trusted Nodes (TN) 104, 106, 108, 110, 112, 114, 116 coupled together in a network. As in the system shown in FIGS. 1A and 1B, each two neighboring Trusted Nodes are separated by less than or equal to a maximum specified distance over which quantum communication is reliable (for example, 100 km or 60 miles, possibly increased in further versions) for each communication hop. The Trusted Nodes perform Quantum Key Distribution among neighboring nodes over a quantum channel or quantum link, for example fiber-optic cable, and communicate data encrypted by quantum key over a standard network, for example ethernet, local area networks, wireless and/or wired networks, the Internet, etc., as further described below. Quantum keys, and existing Quantum Key Distribution protocols are considered known, and it is further contemplated that variations of the present system could use further quantum key generation and Quantum Key Distribution protocols and components while retaining relevant aspects of the presently described system and architecture.

Although a single end to end chain is shown in FIG. 1C, various further network configurations are readily devised and usable for embodiments of the system (see, e.g., FIG. 1B). Each Trusted Node has a Trusted Node Controller (TNC) and one or more Alice modules and one or more Bob modules. An exception to this is that an endpoint Trusted Node 104, 116 could have just one Alice module or just one Bob module. Each neighboring pair of Trusted Nodes, connected by a quantum channel (depicted as a solid line), exchanges a quantum key, by an Alice module transmitting to a Bob module over the quantum channel. Thus, an Alice module and a Bob module, connected by a quantum channel, perform Quantum Key Distribution or quantum key exchange, so that each generates and has a quantum key that is used by the respective Trusted Node to encrypt or decrypt data transmitted separately over a network. For example, the Alice module and Bob module could use BB84 (Charles H. Bennett and Gilles Brossard, 1984) protocol or E91 (Arthur Eckert, 1991) protocol and suitable photonics and communication over suitable service channel(s). Each paired Alice module and Bob module, in companion Trusted Nodes separated by a hop distance, generates a quantum key or series of quantum keys shared by the paired Alice module and Bob module, but distinct from quantum keys generated by other Alice module and Bob module pairs across the trusted network. The quantum key exchanged by a neighboring pair of Trusted Nodes is not known to any other nodes in the system. In various embodiments described below, the data that is encrypted and decrypted using a quantum key is itself a key, in some embodiments a quantum key (e.g., generated with a quantum random number generator), and this key is thereby passed from one Trusted Node to another Trusted Node, starting at one endpoint Trusted Node and ending at another endpoint Trusted Node. This key, passed by a series of encryption, decryption, re-encryption, etc., using quantum keys at each hop, is then used by an endpoint Trusted Node to encrypt data and used by the other endpoint Trusted Node to decrypt the data.

Here is a guide to the nomenclature for key handling functions in FIG. 1C.

Key Handling Functions $E(x,y)$—Symmetric encryption of x by y $PK<\#>$ is a key that is exchanged, for example using FIPS-validated key exchange methods $QK<\#>$ is a set of bits generated by QKD systems, a quantum key $C(t)$ and $D(t)$ are encrypted and plain-text data streams, respectively In the scenario depicted in FIG. 1C, the first endpoint Trusted Node 104 transmits the quantum key QK1 through a quantum channel to the first of a number of middle-Trusted Nodes, Trusted Node 106. There could be just about any number of Trusted Nodes, termed middle-Trusted Nodes, between two endpoint Trusted Nodes 104, 116 in further examples readily devised. That first one of the Trusted Nodes in the middle, Trusted node 106, transmits quantum key QK2 to the next Trusted Node 108. Trusted Node 108 transmits quantum key QK3 to the next Trusted Node 110. Trusted Node 110 transmits quantum key QK4 to the next Trusted Node 112. Trusted Node 112 transmits quantum key QK5 to the next Trusted Node QK 114. And, Trusted Node QK 114 transmits quantum key QK6 to the second endpoint Trusted Node 116. These quantum key exchanges can be done in parallel, and need not be done in sequence. Any of the quantum key transmission, sharing or exchanges could be done in the opposite direction, with appropriately paired quantum key engines.

Meanwhile, at any time before, during or after these quantum key exchanges, the two endpoint Trusted Nodes 104, 116 perform a public key exchange of keys PK1 and PK2, over a network (depicted as a dot dashed line). It is not necessary that these keys be exchanged using Quantum Key Distribution, although in a further embodiment, they could be, for example using key passing through encryption, decryption and re-encryption with quantum keys as described above.

The first endpoint Trusted Node 104 generates a key K1, also at any time during this process. For example, this key could be generated using a random number generator, a deterministic random number generator, a quantum random number generator, or a number from a quantum random number generator used as a seed for a deterministic random number generator, etc. A key that is based in some way on a quantum random number generator is called a quantum key.

To initiate key passing, the initiating or first transmitting node, endpoint Trusted Node 104, combines K1 with PK1. For example, K1 could encrypted by PK1, forming E(K1, PK1) (as shown in FIG. 1C), or otherwise combined with PK1 in a decryptable, recoverable or extractable manner as readily devised. The resulting key is called combined key K1, as the Trusted Node has no knowledge of anything other than that it has been passed a key. Endpoint Trusted Node 104 generates encrypted combined key K1 by encrypting combined key K1 with QK1, a quantum key exchanged by neighboring trusted nodes 104, 106, forming E(E(K1,PK1), QK1). Then, the endpoint Trusted Node sends this encrypted combined key K1 to the next Trusted Node 106 over a network (depicted in FIG. 1C as large dashed line for key transmission). Trusted node 106 uses QK1 to decrypt the encrypted combined key K1 to recover the combined key K1, then encrypts the combined key K1 using a similarly generated QEK2 to form E(E(K1,PK1),QK2) and sends this encrypted combined key K1 over a network to the next Trusted Node 108 with which the Trusted Node 106 has shared QK2. Trusted Node 108 uses QK2 to decrypt the encrypted combined key K1 to recover combined key K1, then re-encrypts this using a similarly generated QK3 to form E(E(K1,PK1),QK3) and sends this encrypted combined key K1 to the next Trusted Node 110 with which Trusted Node 108 has exchanged QK3. This procedure of decryption using one quantum key shared with the previous Trusted Node and re-encryption using another quantum key shared with a subsequent or following Trusted Node repeats through however many nodes and hops are needed to get to the other end point, e.g., Trusted Node 116. The other endpoint, Trusted Node 116, which has received QK6 through a quantum channel from preceding Trusted Node 114, decrypts the encrypted combined key QK1 received as E(E(K1,PK1),QK6), using a similarly generated QK6, to produce combined key K1 as E(K1,PK1). This other or second endpoint Trusted Node 116, also has the key PK1 as described above in the public key exchange with the first endpoint Trusted Node 104, and uses PK1 to decrypt the combined key K1 (i.e., E(K1,PK1) or K1 encrypted with PK1), extracting or otherwise forming K1. Now both endpoint Trusted nodes 104, 116 have key K1, and can use K1 to encrypt and decrypt data. For additional security, and compliance with FIPS requiring the use of an FIPS-validated key, the two endpoints also use key PK2, to encrypt and decrypt data. Specifically, in this embodiment each endpoint forms a key as E(K1,PK2) and uses that key to encrypt or decrypt. One endpoint Trusted Node encrypts data D(T) with the key E(K1, PK2) and transmits the encrypted data C(T)=E(D(T),E(K1,PK2)) over a network, depicted in FIG. 1 as the small dashed line for encrypted data between encryptor/router 118 coupled to Trusted node 116, and encryptor/router 102 connected to Trusted Node 104. The other endpoint Trusted Node receives that encrypted data and decrypts with the key E(K1,PK2). This encrypted data transmission can go in either direction to or from either endpoint Trusted Node 104, 116.

In one scenario, using FIG. 1C, customer nodes are trusted nodes 104 and 116. With this use, the customer nodes (trusted nodes 104, 116) are exchanging key PK1. One customer node, trusted node 104, generates key K1, and encrypts K1 with PK1 to form E(K1, PK1). The customer node, trusted node 104, exchanges quantum key QK1 with the first trusted node 106 of a trusted node network (formed by or including trusted nodes 106, 108, 110, 112, 114). The customer node, trusted node 104, then encrypts E(K1, PK1) with quantum key QK1 to form E(E(K1, PK1), QK1), and transmits this encrypted value to trusted node 106 of the trusted node network. Decryption and encryption hops using quantum keys proceed as described previously, so that the encrypted value E(K1, PK1) ends up at the other customer node, trusted node 116. This other customer node, trusted node 116, then decrypts E(K1, PK1), using PK1, to recover K1. The two customer nodes, trusted nodes 104, 116 then communicate as described previously and shown in FIG. 1C, using E(K1, PK2) to encrypt and decrypt data. With this scenario, only the customer nodes, trusted nodes 104, 116, handle keys K1 and PK2 directly. The trusted nodes 106, 108, 110, 112, 114 in the trusted node network never see key K1 in unencrypted form, and never see PK2 in unencrypted form.

In summary, FIG. 1C depicts a quantum key distribution system, which could also be termed a quantum communication network system, or quantum key encrypted data system, that exchanges quantum keys between neighboring Trusted Nodes, and passes a key from one endpoint Trusted node to another endpoint Trusted Node through a series of hops to Trusted Nodes with encryption, decryption and re-encryption using quantum keys. The key, which can be a quantum key in some embodiments, is then used by endpoint Trusted Nodes for encrypting and decrypting data that is transmitted from one endpoint Trusted Node to the other endpoint Trusted Node over a network. Further component and system details, variations, software and hardware in various functions, and further keys and types of security are described below.

Figure 1D:
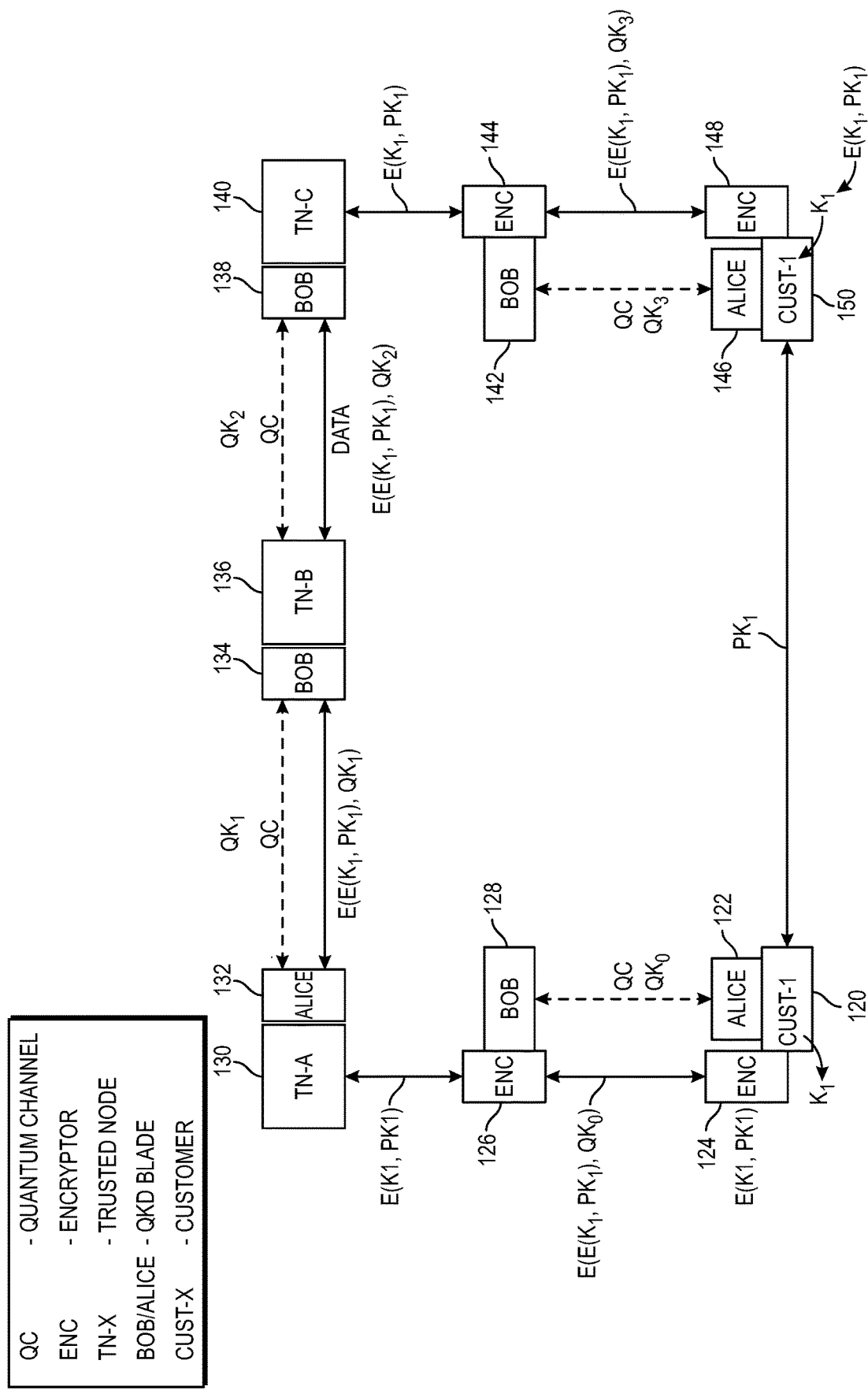
FIG. 1D illustrates a Quantum Key Distribution system featuring distribution of a customer key using network hops over Trusted Nodes with encryption and decryption by quantum keys in accordance with present embodiments.

FIG. 1D illustrates a Quantum Key Distribution system featuring distribution of a customer key using network hops over Trusted Nodes 130, 136, 140 with encryption and decryption by quantum keys in accordance with present embodiments. Customer nodes 120, 150, each labeled "Cust-1" are at opposed endpoints of the network depicted in FIG. 1D, and exchange key PK1 with each other over a network, for example using known key exchange techniques over a standard network that is not required to have a quantum channel. Customer node 120, at the lower left FIG. 1D, generates, receives or otherwise obtains customer key K1, which should never be sent in unencrypted form over any network. Using key PK1 and encryption module 124, customer node 120 encrypts key K1 to obtain E(K1, PK1), which can be called encrypted key K1. This is one possible way to pass keys, and other ways of passing keys are applicable in further embodiments. Neighboring Alice and Bob modules exchange quantum keys, all across the network through quantum channels. The Alice module 122 coupled to the customer node 120 exchanges quantum key QK0 with the Bob module 128 of trusted node 130 labeled "TN-a" over their quantum channel. Alice module 132 of trusted node 130 labeled "TN-a" exchanges quantum key QK1 with Bob module 134 of trusted node 136 labeled "TN-b". An Alice module (not shown) of trusted node 136 "TN-b" exchanges quantum key QK2 with Bob module 138 of trusted node 140 "TN-c". And, Bob module 142 coupled to trusted node 140 "Tn-c" exchanges quantum key QK3 with Alice module 146 coupled to customer node 150. Alternatively, the Alice and Bob modules of any neighboring quantum channel-connected pair could be swapped in various embodiments. Further, the quantum channel-connected network (i.e., network of quantum tunnels) could be expanded with the addition of further trusted nodes for more network hops and greater distance of quantum key distribution.

Encryption module 124 coupled to customer node 120 encrypts encrypted key K1 or E(K1, PK1), with quantum key QK0, forming encrypted encrypted K1, doubly encrypted K1 or E(E(K1, PK1), QK0), and transmits this over a network to the encryption module 126 coupled to the trusted node 130 "TN-a". The encryption module 126 coupled to the trusted node 130 "TN-a" decrypts E(E(K1, PK1), QK0) using quantum key QK0 to recover encrypted key K1 or E(K1, PK1), which is forwarded (optionally encrypted by a local key, for example a shelf key) within the trusted node 130 "TN-a". Trusted node 130 "TN-a" encrypts E(K1, PK1) with quantum key QK1 to obtain E(E(K1, PK1), QK1), and sends this over a network to trusted node 136 "TN-b". Trusted node 136 "TN-b" decrypts E(E(K1, PK1), QK1) using quantum key QK1 to obtain encrypted key K1 or (E(K1, PK1), then encrypts (E(K1, PK1) using quantum key QK2, to form E(E(K1, PK1), QK2), and sends this over a network to trusted node 140 "TN-c". Trusted node 140 "TN-c" decrypts E(E(K1, PK1), QK2) using quantum key QK2, to obtain encrypted key K1 or E(K1, PK1) and forwards this (optionally encrypted by a local key, for example a shelf key) to the encryption module 144. Encryption module 144 encrypts E(K1, PK1) using quantum key QK3, to form E(E(K1, PK1), QK3), and sends this over a network to the customer node 150. The encryption module 148 coupled to the customer node 150 decrypts E(E(K1, PK1), QK3, using quantum key QK3, to obtain E(K1, PK1), then decrypts E(K1, PK1), using key PK1, to obtain key K1. Now both customer nodes 120, 150 have key K1, which has been passed from node to node in a series of hops over trusted nodes through quantum tunnels with encryption and decryption by quantum keys, without ever being exposed in unencrypted form on the network. Customer nodes 120, 150 can use key K1 to encrypt and decrypt data that is sent encrypted by key K1 between the customer nodes 120, 150 over a regular network, without need of a quantum channel for transmission of that encrypted data. Alternatively, other data can be sent the same way the key K1 (e.g., encrypted key K1) was sent over the network hops with encryption and decryption by quantum keys. This network is expandable in ways comparable to the networks shown in FIGS. 1B and 1C, with the addition of further trusted nodes, for longer distances, more customers and/or more customer nodes.

Figure 2:
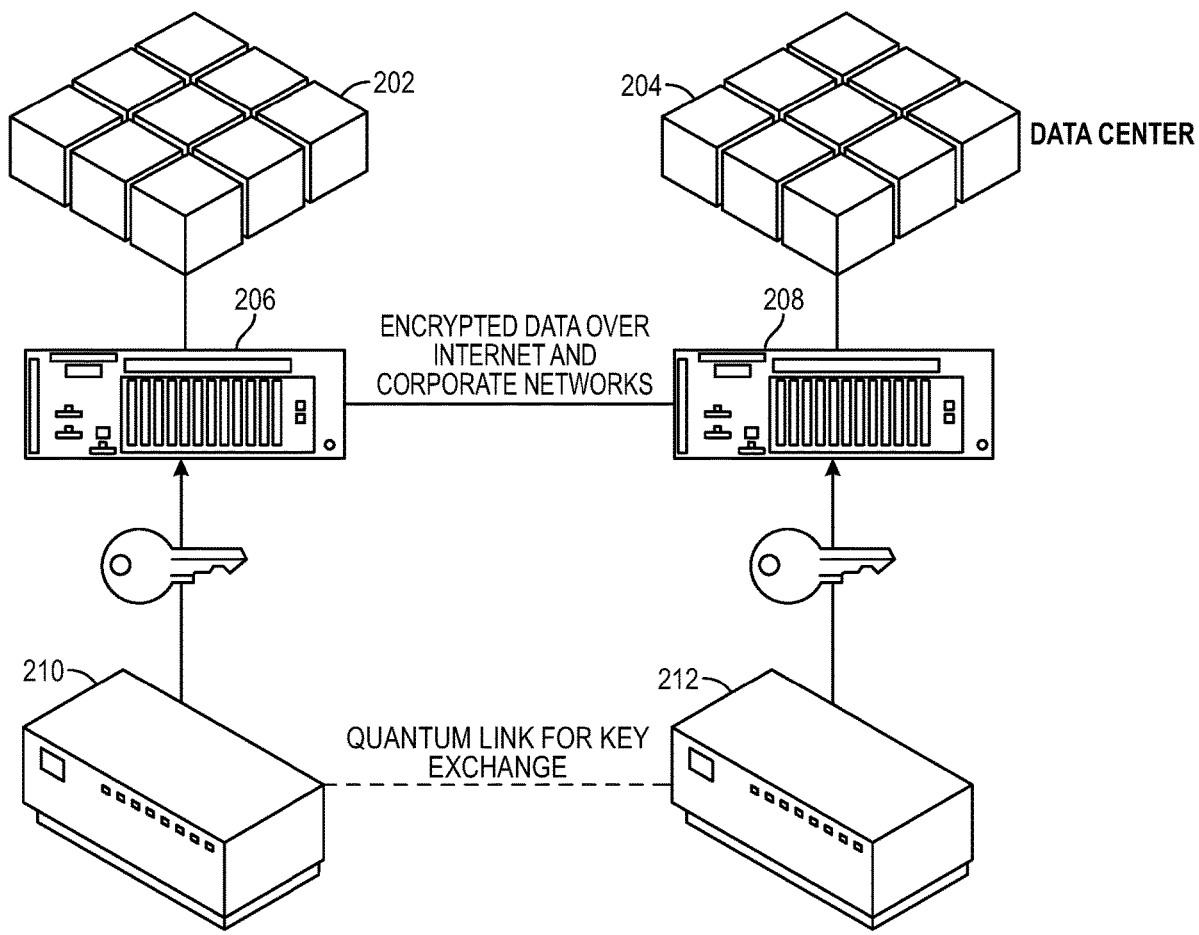
FIG. 2 illustrates two nodes with a quantum link for key exchange and a network link for encrypted data, and separation limited by a maximum distance for the quantum link.

FIG. 2 illustrates two nodes with a quantum link for key exchange and a network link for encrypted data, and separation limited by a maximum distance for the quantum link. Quantum Key Distribution (QKD) uses the quantum properties of single photons to exchange bits between two locations. Keys are derived from the exchanged quantum information. QKD is provably secure. Security is based on the laws of physics, not on "hard" math problems.

QKD has forward security. Keys can be made truly random (unlike conventional PKI keys) and are not susceptible to future computational improvements. Any attempt to intercept the key is detected and the key is rejected. QKD in some versions requires a physical link between locations with key repeater/routers (e.g., Trusted Nodes) every 100 km or 60 miles (based on the attenuation limit of the quantum link, for example fiber-optic cable) and at each point of interconnection. Systems can be integrated with high-speed encryptors to provide FIPS-compliant, secure information exchange.

The example system in FIG. 2 has two data centers 202 communicating securely with each other through encryptors 206, 208 and Trusted Nodes 210, 212. The Trusted Nodes 210, 212 exchange a quantum key over a quantum link (or quantum channel), and the encryptors 206, 208 use this quantum key to encrypt and decrypt data, and send and receive the encrypted data over a network such as the Internet and/or corporate networks.

However, the two data centers 202, 204 are limited by the attenuation limit of the quantum link, and can only be so far apart. Embodiments of the quantum communication network system, or quantum key encrypted data system described herein make use of aspects of the system shown in FIG. 2, adding the feature of multiple hops from Trusted node to Trusted node to transmit a key as the data encrypted by a quantum key at each hop, and decrypted and re-encrypted at the next hop. In so doing, present embodiments respect but are not limited by a single length of a quantum link, and respective data centers 202, 204 can be any number of hops and Trusted Nodes apart.

Figure 3:
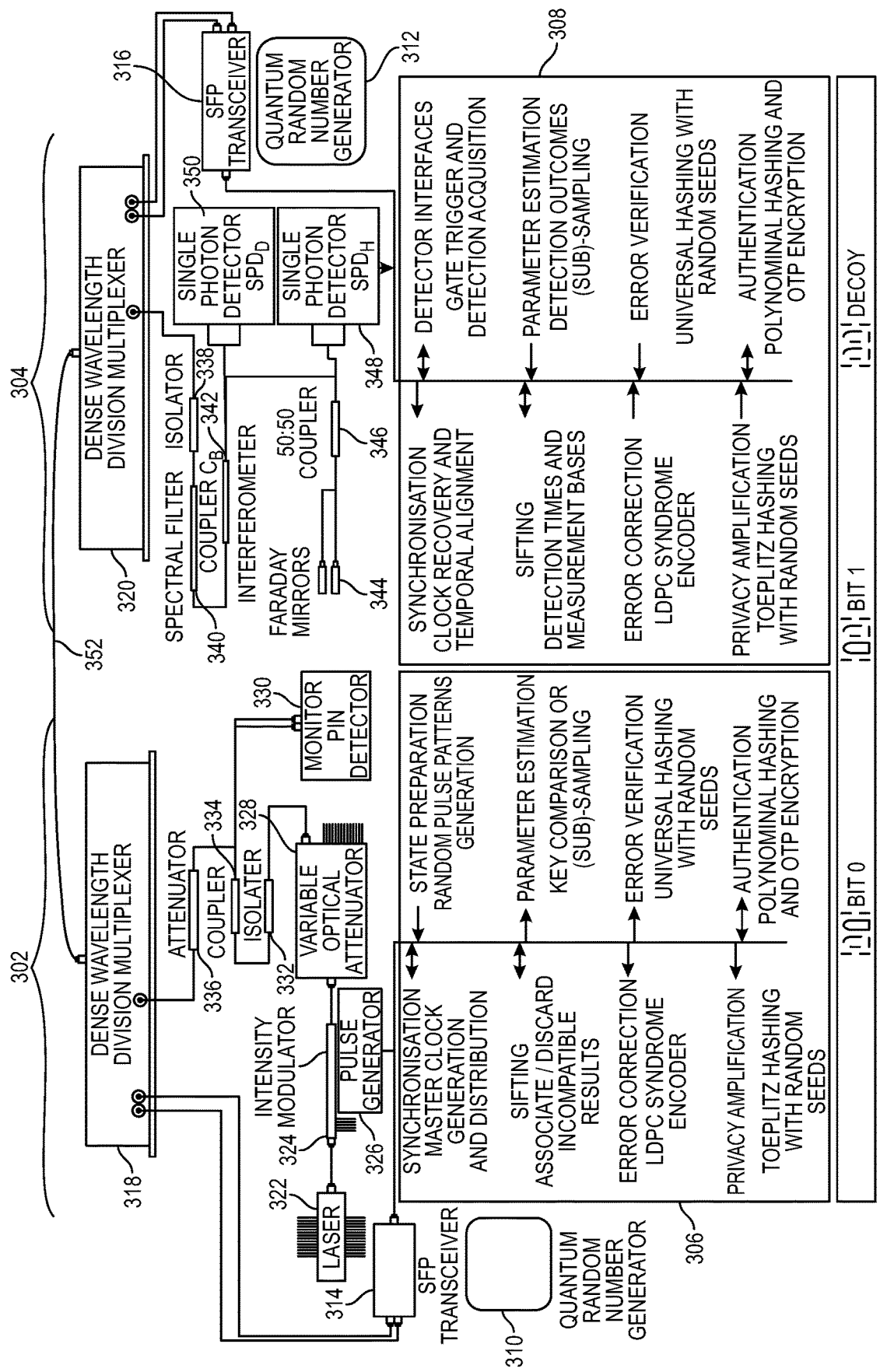
FIG. 3 depicts an Alice module transmitting over a quantum channel to a receiving Bob module, using a Coherent One-Way (COW) protocol for quantum communication.

FIG. 3 depicts an Alice module 302 transmitting over a quantum channel to a receiving Bob module 304, using as an example, the Coherent One-Way (COW) protocol for quantum communication. This Alice module 302 and Bob module 304, and variations thereof, are suitable for embodiments of the system described herein. Components suitable for embodiments using Coherent One-Way, BB 84 protocol, and single photons encrypted with phase modulation are available from ID Quantique SA of Geneva, Switzerland. Components may also be available from Toshiba of Tokyo, Japan or other vendors. The details of such components are not intended to be part of the present invention, nor is this invention limited by the use of any particular quantum protocol or hardware or software vendor.

In the Alice module 302, photons from a laser 322 are passed through an intensity modulator 324, variable optical attenuator 328, isolator 332, coupler 334 and attenuator 336 into a dense wavelength division multiplexer (DWDM) 318. Photons from the coupler 334 are monitored by a monitor PIN (p-i-n photodiode) detector 330. A controller 306 performs various functions described below, and operates hardware, including a pulse generator 326, quantum random number generator QRNG 310 and small form factor pluggable (SFP) transceiver 314 coupled to the dense wavelength division multiplexer 318. Photons from the dense wavelength division multiplexer 318 are sent over the quantum channel 352 or quantum link, in this example a fiber-optic cable, from the Alice module 302 to the Bob module 304. The photons are formatted as zero bits, one bits and/or decoy bits, with phase modulation. Variations are possible, using quantum superposition or quantum entanglement, which may be according to a protocol.

The controller 306 in the Alice module 302 performs synchronization with master clock generation and distribution, sifting with assurance and discard of incompatible results, error correction, for example using low density parity check (LDPC) syndrome decoder, privacy amplification, for example using Toeplitz hashing with random seeds, state preparation with random pulse pattern generation, parameter estimation with key comparison or sub-sampling, error verification with universal hashing with random seeds, and authentication with polynomial hashing and OTP encryption. The controller 306 may perform further tasks as readily devised.

In the Bob module 304, photons are received over the quantum channel 352 into a dense wavelength division multiplexer 320 passed through an isolator 338, spectral filter 340, coupler 342 and 50:50 coupler 346 to faraday mirrors 344 arranged as an interferometer. Photons from the coupler 342 are detected by a single photon detector (SPD$_D$) 350 (e.g., detecting single photons with diagonal polarization). Photons from the 50:50 coupler 346 are detected by another single photon detector (SPD$_H$) 348 (e.g., detecting single photons with horizontal or vertical polarization). A controller 308 performs various functions described below, and operates hardware, including a quantum random number generator 312, the single photon detectors 348, 350 and SFP transceiver 316 coupled to dense wavelength division multiplexer 320. Photons received by the Bob module 304 are detected by the Bob module 304 and resolved through communication with the Alice module 302 so that, after resolution, both the Alice module 302 and the Bob module 304 agree on the quantum data that they share, or equivalently that they have exchanged or that the Alice module 302 has transmitted to the Bob module 304.

The controller 308 in the Bob module 304 performs synchronization with clock recovery and temporal alignment, sifting with detection times and measurement bases, error correction, for example using LDPC syndrome encoder, privacy amplification, for example using Toeplitz hashing with random seeds, operation of detector interfaces, with gate trigger and detection sequences, parameter estimation with detection outcome sampling or sub-sampling, error verification with universal hashing with random seeds, and authentication with polynomial hashing and OTP encryption. The controller 308 may perform further tasks as readily devised.

Figure 4:
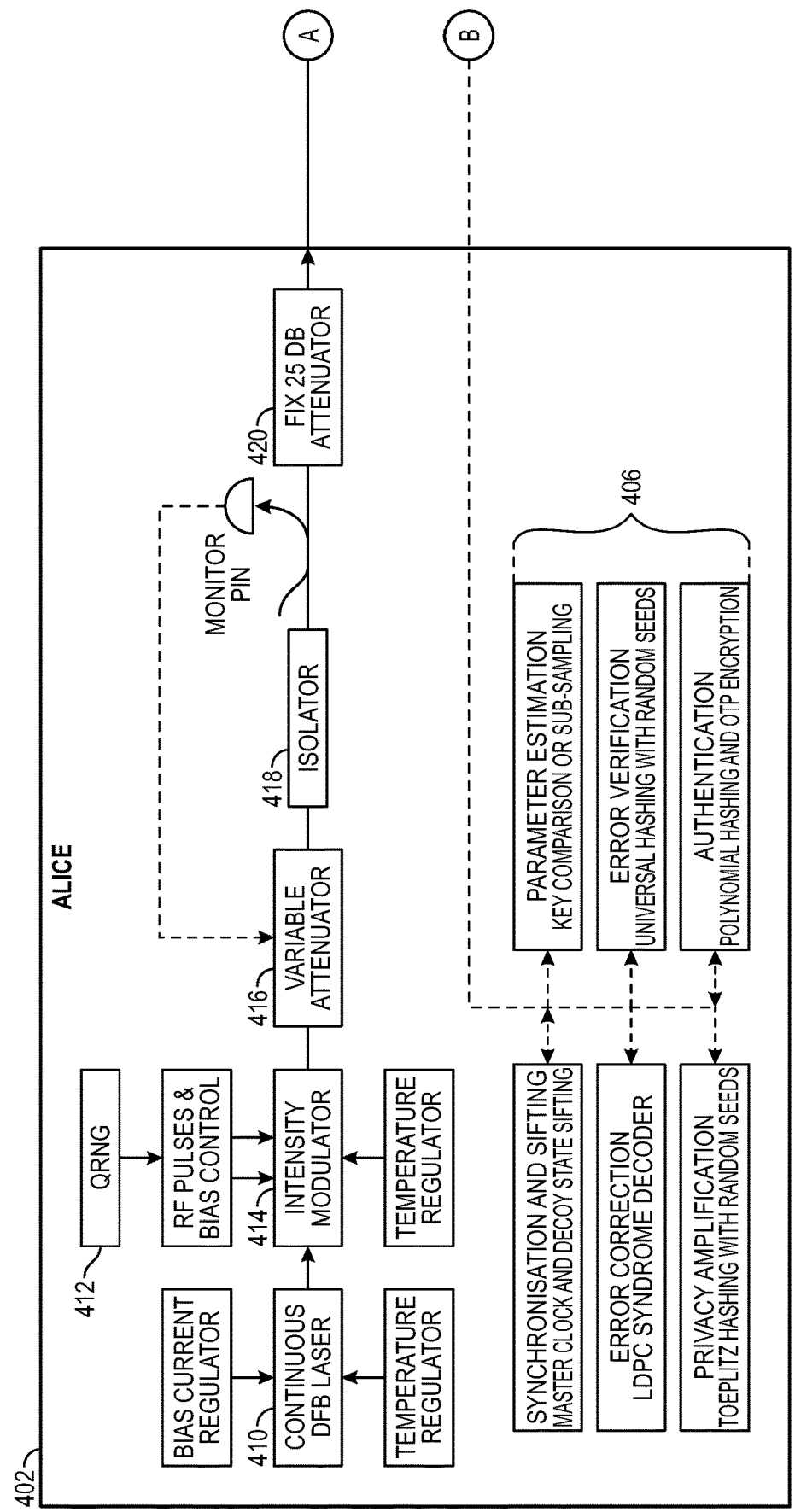
FIG. 4 is a further embodiment of an Alice module and a Bob module, communicating over a quantum channel and an authenticated synchronization and distillation channel.
Figure 4:
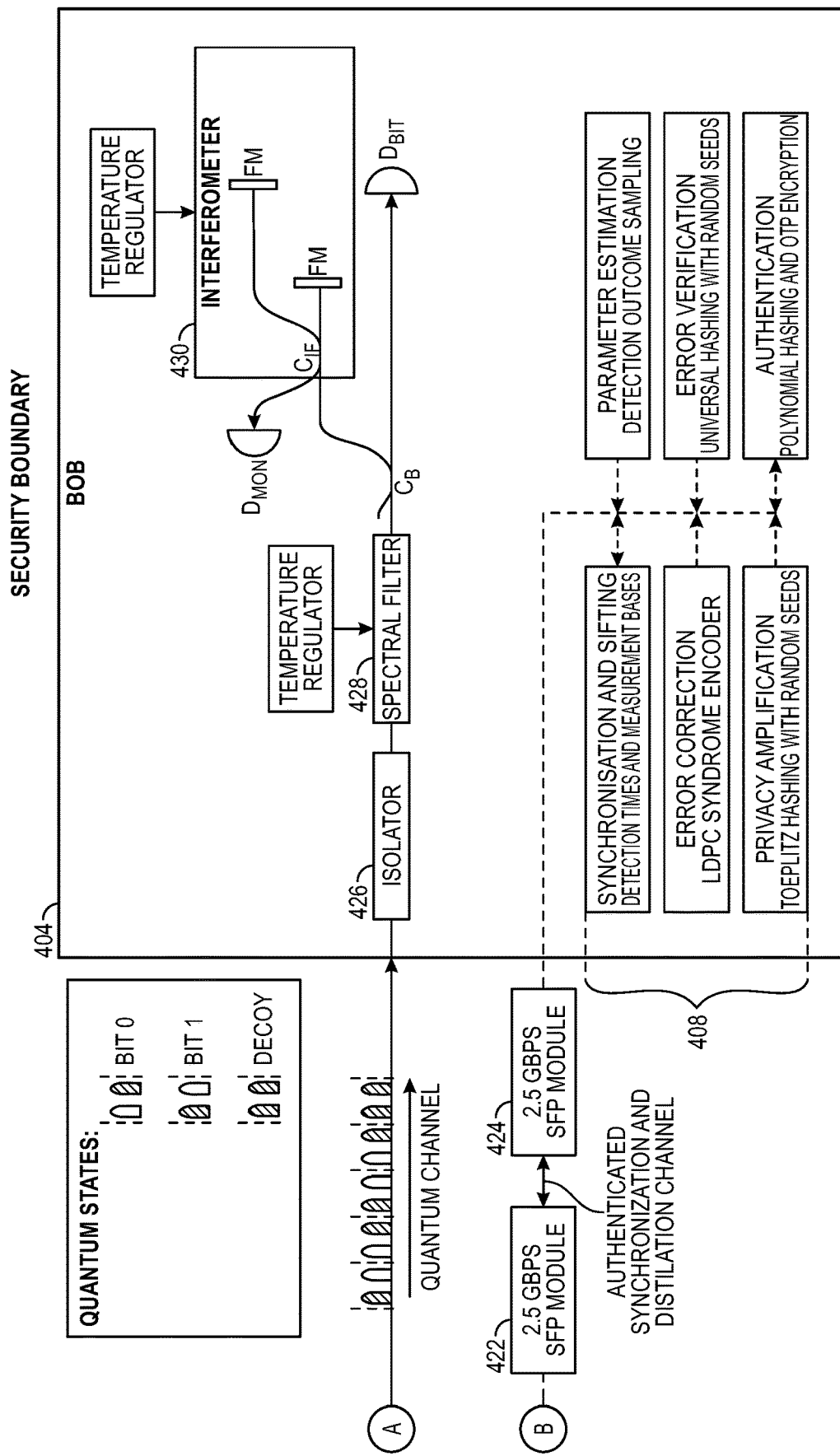

FIG. 4 is a further embodiment of an Alice module 402 and a Bob module 404, communicating over a quantum channel and an authenticated synchronization and distillation channel. The quantum channel can be implemented using a fiber-optic cable, and the authenticated synchronization and distillation channel can be implemented over a network, for example using the 2.5 gigabits per second SFP modules 422, 424. This Alice module 402 and Bob module 404, and variations thereof, are suitable for embodiments of the system described herein. The Alice module 402 transmits photons in quantum states over the quantum channel to the Bob module 404. Then, the controller 406 of the Alice module 402 and the controller 408 of the Bob module 404 communicate with each other over the authenticated synchronization and distillation channel, to resolve the data.

In the Alice module 402, photons from a continuous distributed feedback (DFB) laser 410 with bias current regulator and temperature regulator are passed through an intensity modulator 414 with temperature regulator and radiofrequency (RF) pulses and bias control supplied by data from a quantum random number generator (QRNG) 412, then through variable attenuator 416, isolator 418 with monitor PIN, and through fixed 25 DB attenuator 420 to be transmitted out through the quantum channel. A controller 406 operates hardware described above. Further, the controller 406 performs various functions or processes, including synchronization and sifting with master clock and decoy state sifting, error correction, for example using LDPC syndrome decoder, privacy amplification, for example using Toeplitz hashing with random seeds, parameter estimation, using key comparison or sub-sampling, error verification, using universal hashing with random seeds, and authentication, using polynomial hashing and OTP encryption. The controller 406 operates the hardware to format the photons as zero bits, one bits and/or decoy bits, using quantum superposition or quantum entanglement according to a protocol. The controller 406 may perform variations of these functions, or further tasks as readily devised.

In the Bob module 404, photons are received over the quantum channel into an isolator 426, passed through a spectral filter 428 with temperature regulator, split through a coupler and passed into an interferometer 430 with temperature regulator, another coupler and two faraday mirrors, to be monitored by D$_{mon}$ and D$_{bit}$. A controller 408 operates hardware described above. Further the controller 408 performs various functions or processes, including synchronization and sifting using detection times and measurement bases, error correction, for example using LDPC syndrome encoder, privacy amplification, for example using Toeplitz hashing with random seeds, parameter estimation, using detection outcome sampling, error verification, for example using universal hashing with random seeds, and authentication, for example using polynomial hashing and OTP encryption. The controller 408 may perform variations of these functions, or further tasks as readily devised.

Post-Processing via public discussion over the synchronization and distillation channel as described above features the following.

Sifting: Bob tells Alice publicly, whether he detected a quantum state in D$_{bit}$ (bit value measurement) or in D$_{mon}$ (interference visibility measurement), incompatible measurements are discarded.

Error correction and parameter estimation: Alice and Bob eliminate quantum bit errors using LDPC error correction, and determine eavesdropper's potential information about the sifted key.

Privacy amplification: Alice and Bob eliminate eavesdropper's potential information about the key by Toeplitz hashing.

Authentication: Alice and Bob verify that public communication was authentic using an optimized Wegman-Carter authentication scheme. Various schemes and various forms of authentication are possible in further embodiments.

Figure 5A:
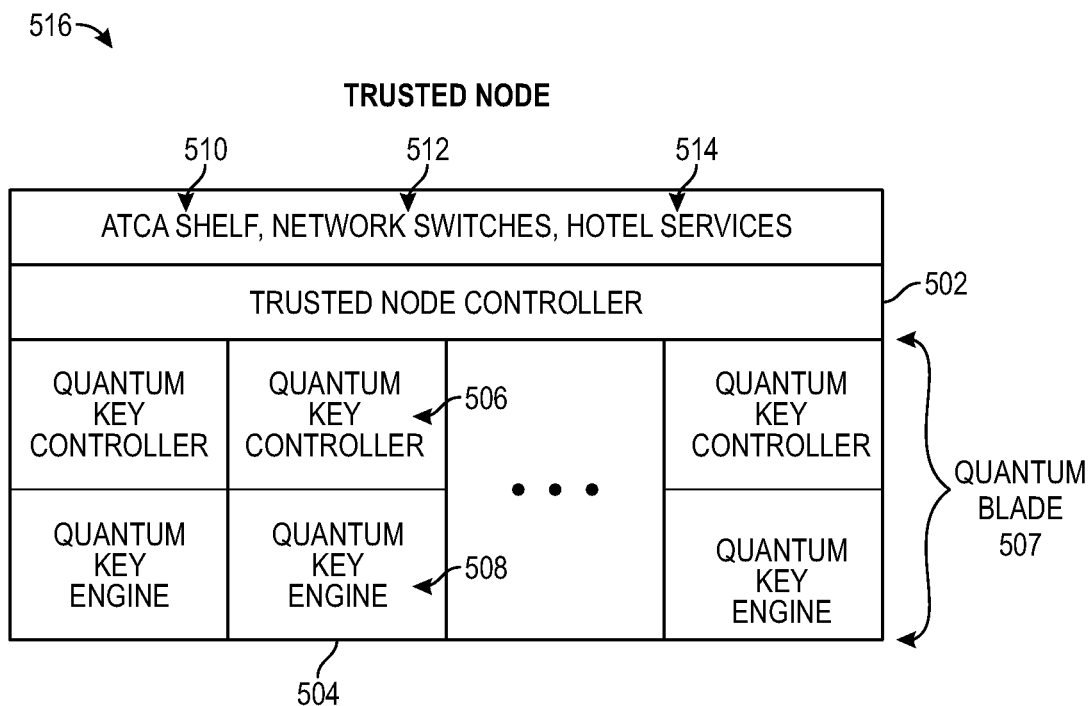
FIG. 5A is a block diagram of a Trusted Node (TN) that has a shelf, network switches, services, a Trusted Node Controller (TNC), and quantum blades each with a Quantum Key Controller (QKC) and Quantum Key Engine (QKE), which can be used in embodiments of the quantum key distribution and communication systems of FIGS. 1A-1C.

FIG. 5A is a block diagram of a Trusted Node (TN) 516 that has a shelf 510, network switches 512, services 514, a Trusted Node Controller (TNC) 502, and quantum blades 504 each with a Quantum Key Controller (QKC) 506 and Quantum Key Engine (QKE) 508, which can be used in embodiments of the quantum key distribution and communication systems of FIGS. 1A-1C. The shelf 510 can be implemented as an Advanced Telecommunication Computing Architecture (ATCA) shelf, in various embodiments. Network switches 512 may conform to appropriate network standards and include one or more processors and various switching architectures. Services 514 can be implemented in software running on one or more processors, including virtual machines, or firmware and may be designated hotel services.

The Trusted Node Controller 502 includes one or more processors, and may be implemented with single or multiprocessor architecture or virtual machine architecture, etc., and software, firmware and/or hardware, in various combinations. Tasks of the Trusted Node Controller 502 include managing the quantum blades 504, keeping track of which quantum blades 504 are partnered in the Trusted Node 516 and from Trusted Node 516 to Trusted Node 516, network switches 512, and services 514, directing distribution of quantum keys, and directing data flow and routing. In various embodiments, the Trusted Node Controller 502 can also manage interface end-user tables and endpoint user interfaces, central databases, traffic data, monitor health, monitor nodes in a network, perform extra functions, etc.

In some embodiments, the Trusted Node Controller 502 has the following features. Redundant node controllers in a single node provide fault tolerance in case of failure of a controller. The Trusted Node Controller 502 can be implemented with multiple processors, failover capabilities from one processor to one or more others, virtual machine with variable processor allocation, and fault tolerance in case of processor or process lockup or failure, in various embodiments.

The Trusted Node Controller 502 manages node discovery and provides route tables for the quantum network.

The Trusted Node Controller 502 manages and routes key transactions.

The Trusted Node Controller 502 has a fault tolerant dynamic path finding algorithm.

Routing balances security and quality of service.

The Trusted Node Controller 502 finds a least cost path across the QKD network, and uses alternate routes when available.

The Quantum Key Engine 508 may be implemented with one or more processors, software, firmware and/or hardware, and can generate keys, including quantum keys, and distribute quantum keys as described above. The Quantum Key Controller 506 performs encryption and decryption of keys and data, manages the Quantum Key Engine 508 for key generation and key exchange, manages key storage and key retrieval. The Quantum Key Controller 506 may be implemented with one or more processors, software, firmware and/or hardware, and have more than one kind of memory, such as random access memory (RAM), flash memory, etc. Each of the Trusted Node Controller 502, Quantum Key Controller 506 And Quantum Key Engine 508 could have one or more application programming interfaces (API) through which to communicate with each other or to other hardware, in various embodiments.

Figure 5B:
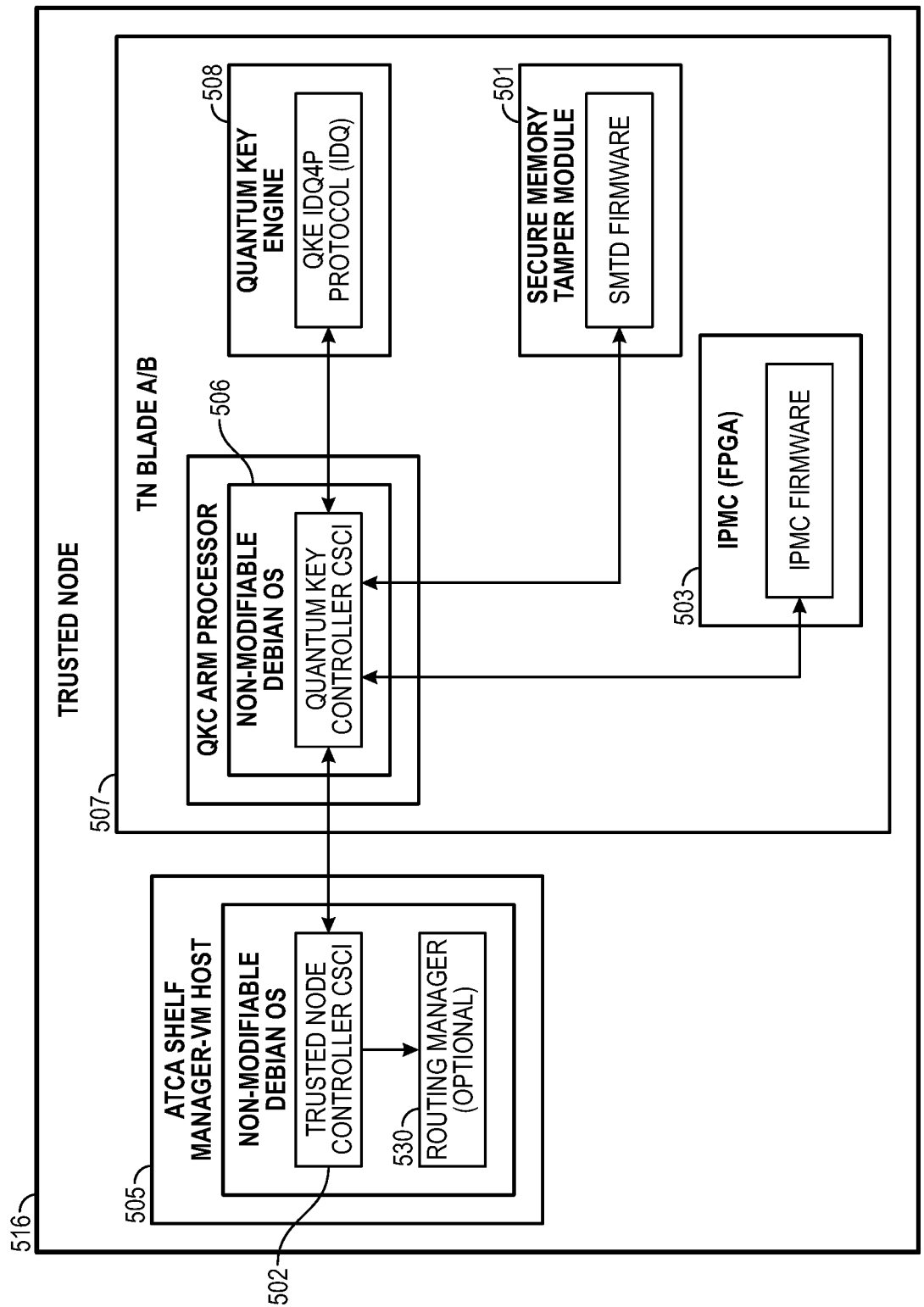
FIG. 5B is a block diagram of a further embodiment of a Trusted Node.

FIG. 5B is a block diagram of a further embodiment of a Trusted Node 516. A shelf manager 605, in one version an ATCA shelf manager acting as a virtual machine (VM) host, has an operating system for the Trusted Node 516. In one version, this is a non-modifiable Debian OS. The Trusted Node Controller 502 is in some embodiments a computer software configuration item (CSCI). A routing manager 530 direct routing of keys and data, both within a Trusted Node 516 and from Trusted Node to Trusted Node. Each Trusted Node blade 507, whether an Alice or A blade, or a Bob or B blade, has an operating system. In one version, this is a non-modifiable Debian OS. The Trusted Node blade 507 has a Quantum Key Controller (QKC) 506 that directs exchanges, handling, encryption and decryption with quantum keys. The Quantum Key engine 508, in some embodiments implementing a QKE IDQ4P protocol from IDQ, generates and exchanges quantum keys with other Quantum Key Engines, as directed by the Quantum Key controller 506. A secure memory tamper module 601 has secure memory tamper detection (SMTD) firmware, for detecting physical tampering and directing appropriate actions. The intelligent peripheral manager controller (IPMC) 503 in some embodiments is a field programmable gate array (FPGA) that has IPMC firmware and handles peripheral tasks and management.

In some embodiments, some or all of the following are configuration items.

Trusted Node Controller (TNC): the software running on the ATCA Shelf Manager is responsible for coordinating QKC-QKC communication and key transactions on the QKD network.

Routing Manager (RM): the software running on a subset of configured Trusted Nodes with the TNC is to maintain node connectivity and activity tables to share with linked TNCs.

Quantum Key Controller (QKC): the software running on the blade ARM processor is responsible for cryptographic services, key management, and Quantum Engine control.

Secure Memory anti-Tamper Module (SMTD): the firmware on a module is designed to store CSPs (critical security parameters) securely with integrated tamper processing and zeroization.

IPMC: FPGA firmware is for controlling the ATCA interface components on the blade.

Quantum Key Engine (QKE): the blade subsystem is responsible for generating random bits and FIPS approved quantum derived symmetric keys to the QKC.

QKE FPGA-AB: the low-level hardware controller firmware for the QKE is specialized for the engine type, either Alice (A) or Bob (B)

QKE Single Board Computer (SBC): the main controller has tasks for the QKE and the interface point to the QKC.

Operating System (OS): the OS for the QKC and TNC is non-modifiable and derived from the Debian Linux kernel, and meets FIPS requirements.

The OS for the QKE is a FIPS validated version of Red Hat Linux.

Alternative embodiments use variations for the above in keeping with the teachings herein.

The Trusted Node Controller 502 is the main controller on the TN responsible for coordinating key transfers and facilitating blade to blade communications internal and external to the local node. The Trusted Node Controller 502 coordinates key transfer as the sender or receiver, and acts as a bridge for local QKCs to communicate with remote QKCs. The TNC operating system is hosted as a Hypervisor VM within the ATCA shelf manager. The TNC is not within the cryptographic boundary so no unencrypted key material will be accessible. FIPS validated libraries are used for development consistency. Secure protocols are used when available and do not impact performance. Messages are to be sent between nodes using a security mechanism such as TLS when available.

The Trusted Node Controller 502 performs the function for internal and external communication for the node including blade messaging, path finding and key exchange. The Routing Manager 530 has a software package configured for a select number of TNs to collect TN network information including quality of service (QoS) and peer connections. Each TN is configured to pull table information from at least one RM in the network. The routing manager 530 manages node discovery through interrogation of known nodes for a list of peers.

Each TNC is configured with a unique identifier to be used as the Node ID. Combined with the internal QKC ID, every blade in the QKD network is uniquely identifiable. This ID is used by the path finding algorithm and the RM. The TNC is configured at startup with local blade parameters (ID, IP, etc.) An internal IP table maps peer TN by paired QKEs. A peer node is a TN that shares a paired QKE.

In operation, the TNC operates with the same operator roles as the QKC, including modes and roles for Crypto Officer, Maintenance, Monitor and User. For security purposes, the login credential will not be shared. The Trusted Node Controller is to for requests from all configured local QKCs, listen for requests from remote TNCs, request path table data from the configured RM(s), and route key material and requests through the network and internal blades.

For Trusted Node Controller pathfinding, the TNC uses path table data collected by the RM(s) to find the least cost path across the QKD TN network. An example algorithm is below.

Algorithm

The algorithm is an implementation of Dijkstra least cost path.

Implemented in the Boost C++ library.

Uses QoS for the path cost for the algorithm.

Quality of Service (QoS)

Numeric value based on several factors including:

Network connectivity, key availability, system status, loading

QoS starts out at zero for a 100% available node.

A node with a failed QKE or one that cannot communicate has a maximum number.

A node may be omitted from path analysis if it exceeds a predefined threshold (i.e. bypass any node with a QoS number greater that 90% of the maximum).

Table Validation

Secure transport protocols help to minimize data tampering. Multiple RM(s) may be polled and data compared for consistency.

The Trusted Node Controller 502, in some versions in cooperation with the routing manager 530, manages node discovery and provides route tables for a quantum communication network, and manages and routes key transactions. In some versions, a fault-tolerant dynamic pathfinding algorithm is used. Routing balances security and quality of service, finds least cost path across the QKD or quantum communication network, and uses alternate routes when available.

Figure 5C:
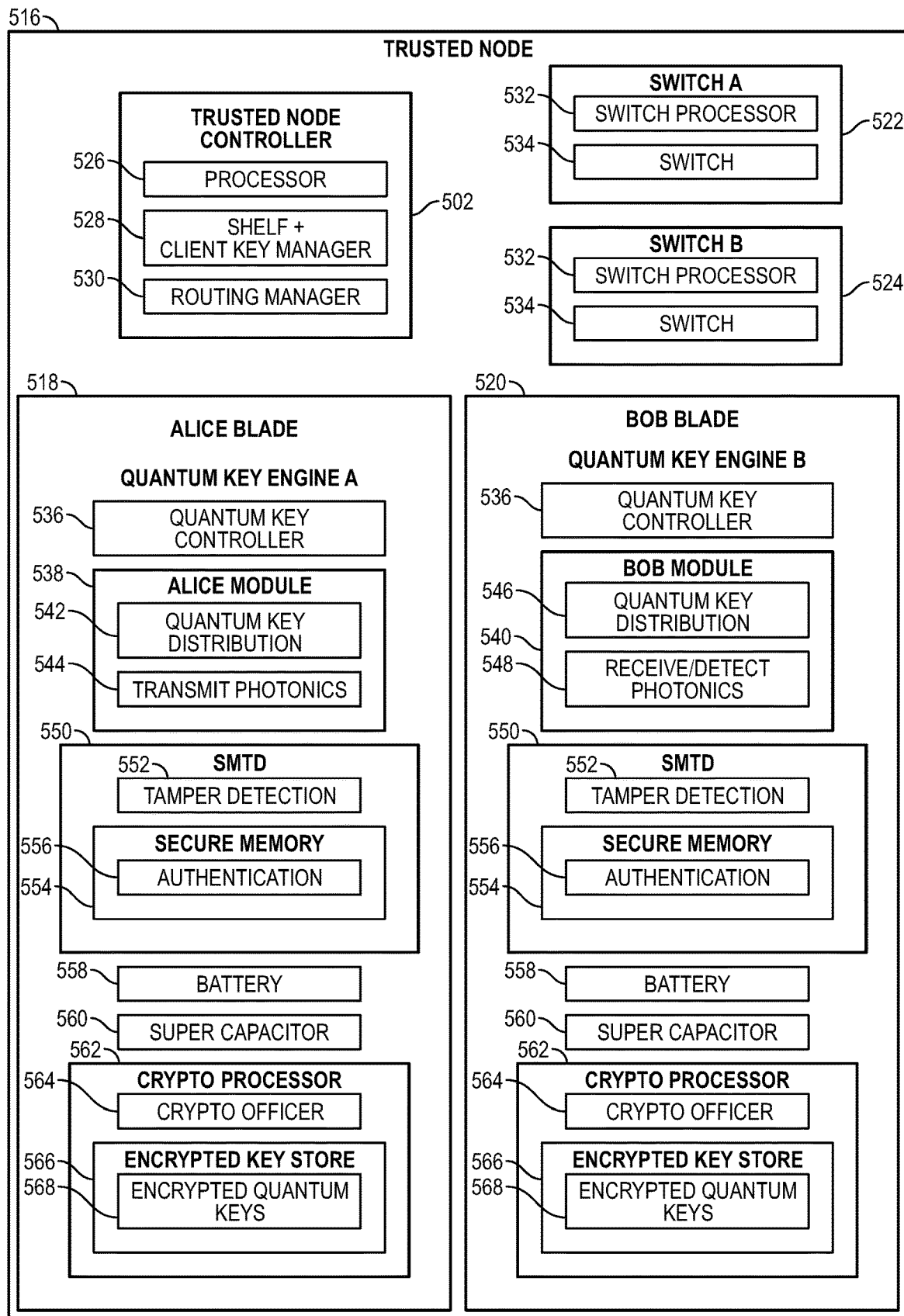
FIG. 5C is a block diagram of a further embodiment of a Trusted Node.

FIG. 5C is a block diagram of a further embodiment of a Trusted Node 516. Still further embodiments of Trusted Nodes can combine various features described herein in further variations readily devised. In the Trusted Node 516, there is a Trusted Node Controller 502 which has one or more processors 526, a shelf and client key manager 528, and a routing manager 530. The routing manager 530 keeps track of routing of data between quantum blades 504 in the system, and to or from a quantum blade 504 in the Trusted Node 516 from or to other Trusted Nodes 516. The shelf and client key manager 528 manages client keys, for communicating with clients, and shelf keys, for encrypting and decrypting data that is sent from one quantum blade 504 to another quantum blade 504 in the Trusted Node 516. With shelf keys, unencrypted data, decrypted data or plain text data is never seen outside of a quantum blade 504, thus improving security. For example, quantum key encrypted data (possibly including a key such as K1) that has been decrypted using a quantum key in an Alice blade 518 or Bob blade 520 can be encrypted using a shelf key and sent to another blade in the same Trusted Node 516 for decryption by the shelf key and re-encryption in that blade using another quantum key (see, e.g., Trusted Node 103 in FIG. 1A, and FIGS. 1B and 1C). Significantly, with the use of shelf keys, the Trusted Node Controller 502 never sees and cannot access unencrypted, decrypted or plain text data. This solves a problem of vulnerability that could occur in a system without shelf keys.

Each of switch A 522 and switch B 524 has a switch processor 532, which could be one or more processors, and a switch 534, which could include many switches in various connection architectures. The switches should conform to appropriate network standards for connection to one or more networks.

The Alice blade 518 and Bob blade 520 have much in common, but differ in the Quantum Key engine A (for Alice) and Quantum Key engine B (for Bob). Both the Alice blade 518 and Bob blade 520 have a quantum Key controller 536, a secure memory tamper detection (SMTD) module 550, a battery 558 and super capacitor 560, and a crypto processor 562. In the Alice blade 518, the Alice module 538 has a Quantum Key Distribution module 542 and transmit photonics 544 specific to the tasks and functionality described above regarding FIGS. 3 and 4. In the Bob blade 520, the Bob module 540 has a Quantum Key Distribution module 546 and receive/detect photonics 548 specific to the tasks and functionality described above regarding FIGS. 3 and 4.

In common in the Alice blade 518 and Bob blade 520, the secure memory tamper detection module 550 has a tamper detection module 552, secure memory 554 and authentication module 556. The authentication module 556 could authenticate users, data, keys, certificates or anything else that needs authentication, and maintain authentication data. The tamper detection module 552 monitors switches, light detectors, sound detectors, temperature detectors, voltage detectors and/or other tamper detection devices to determine whether the enclosure is opened, battery is disconnected, circuit boards are removed and/or other physical tampering occurs. Upon detection of tampering, the tamper detection module 554 erases, writes zeros, ones, a pattern or multiple patterns or performs other single or multiple actions on the secure memory 552. For example, the tamper detection module 552 could erase, delete or overwrite once or multiple times the quantum keys, shelf keys, other keys, authentication data, etc., which may be collectively termed critical security parameters (CSP) stored in the secure memory 552. In this embodiment, the tamper detection module 552 cooperates with the crypto processor 562, to delete encrypted quantum keys 568 in the encrypted key store 566 under tamper conditions.

A battery 558 provides power in case of power loss, so that the data in the secure memory 554 is maintained and the tamper detection module 552 remains active. In some versions, the battery 558 provides power during shipping of the Trusted Node 516, so as to detect tampering during shipping. In case the battery 558 is disconnected, the super capacitor 560 provides sufficient power for a sufficient length of time, so that the tamper detection module 552 can perform appropriate actions on the secure memory 552. For example, if no user has been properly authenticated for servicing the system, and the battery 558 is detected as removed, tamper detection module 552 deletes the critical security parameters with power provided by the super capacitor 560. Or, if a user is properly authenticated for servicing the system, including battery replacement, the tamper detection module 552 maintains the critical security parameters with power provided by the super capacitor 560 during the battery replacement.

The crypto processor 562, implemented with one or more processors, manages encryption and decryption, and encrypts quantum keys in stores unencrypted quantum keys 568 and an encrypted key store 566. The crypto officer 564 stores a password for user access to the functions of the crypto processor 562, in one version, for example for the above-described servicing of the system.

In one embodiment, key storage is as follows.

Keys and CSPs will be stored securely based on type.

Encrypted Key Store—Volatile memory

Keys are encrypted in place within a construct located in volatile memory.

The key encryption key, KEK is protected by a different mechanism.

This includes User, quantum and RSA keys.
Available memory is sufficient to store 4 million keys with meta data.
Secure Memory—Physical hardware
Keys and CSPs are stored in an encrypted tamper resistant chip set.
KEK (key encrypting key) for the key store resides here, formally referenced as the Memory Key.
All internal secure memory data is zeroized upon a tamper detect.
Memory space is limited and is reserved for specialized keys and CSPs.
This includes the memory, shelf, VPN, QKE Initialization keys.
Zeroization of the memory key renders the key store unusable.
This meets the FIPS requirement to zeroize all stored key and CSP material.

Figure 6:
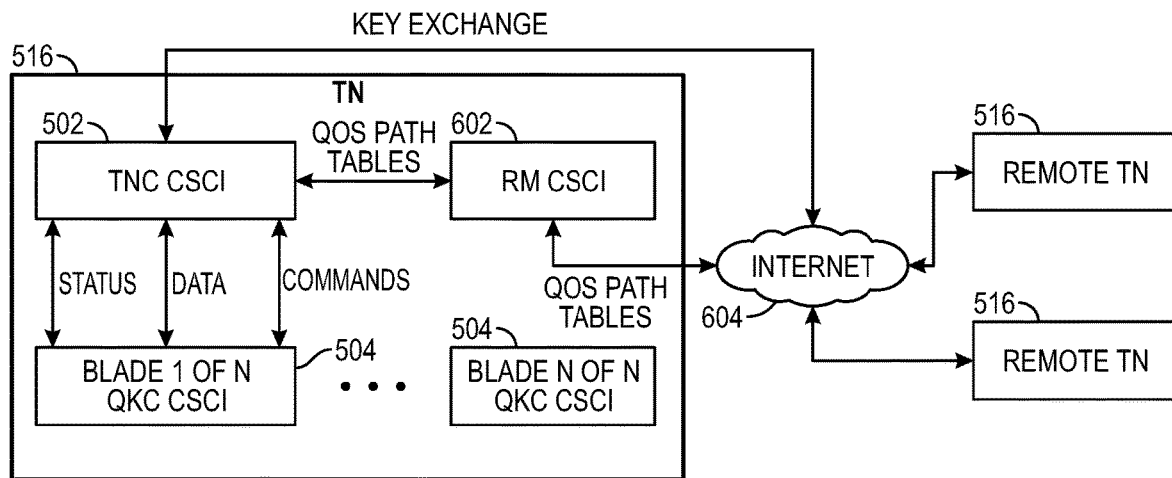
FIG. 6 is a further block diagram of a Trusted Node, depicting network interfaces through which Trusted Nodes in the quantum key distribution and communication systems can communicate via a network such as the Internet.

FIG. 6 is a further block diagram of a Trusted Node 516, depicting network interfaces through which Trusted Nodes 516 in the quantum key distribution and communication systems can communicate via a network such as the Internet. In this embodiment, the Trusted Node Controller 502, routing manager (RM) 602, and quantum blades 504 1 through N are each considered a computer software configuration item (CSCI), and may be subject to updates or upgrades of software or firmware. The Trusted Node Controller 502 can perform key exchange over a network 604 such as the Internet with other remote Trusted Nodes 516. Inside the Trusted node 516, the Trusted Node Controller 502 can communicate regarding Quality of Service (QoS) path tables with the Routing Manager 602, and can communicate regarding status, data or commands with each of the quantum blades 504. The routing manager 602 of one Trusted Node 516 can communicate regarding QoS path tables with other remote Trusted Nodes 516 via a network 604 such as the Internet.

Figure 7:
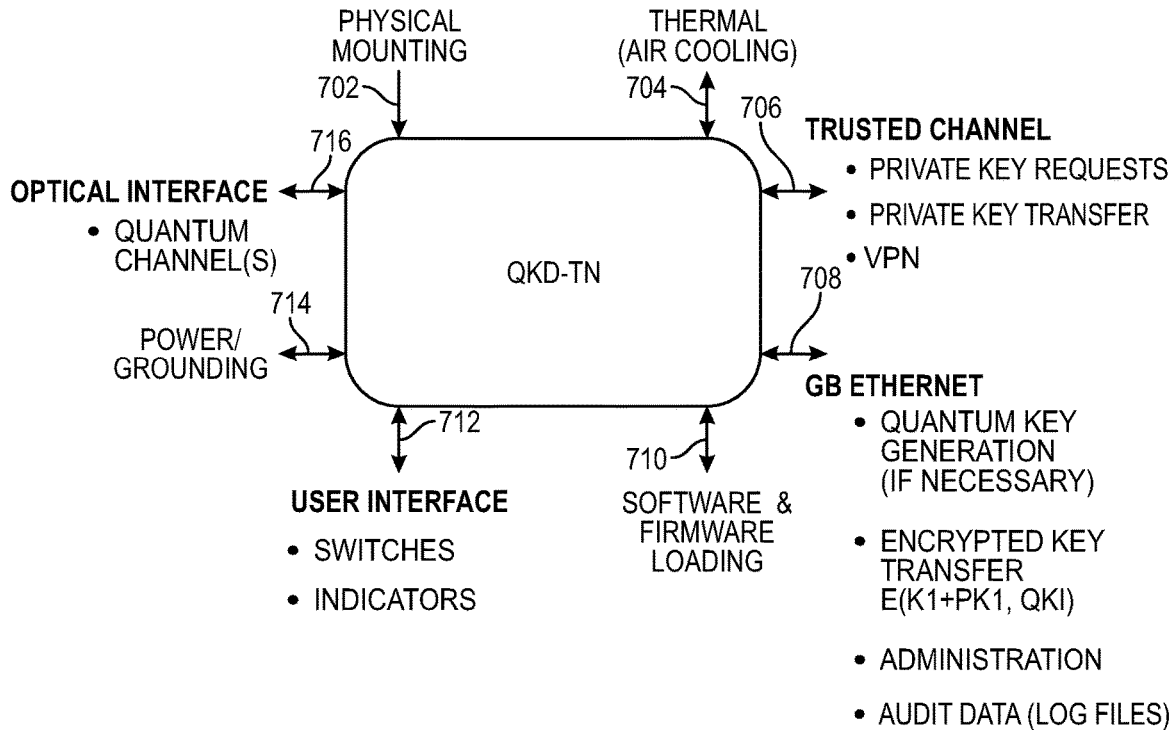
FIG. 7 depicts interfaces and functional uses of the interfaces, of a Trusted Node.

FIG. 7 depicts interfaces and functional uses of the interfaces, of a Trusted Node. A physical mounting interface 702 could include chassis or other enclosure(s) of individual components, groups of components and/or the entire Trusted Node. A thermal interface 704 could arrange for air cooling, or in further embodiments liquid cooling. A trusted channel interface 706 is used for private key requests, private key transfer, virtual private network (VPN), etc. An ethernet interface 708 (or other network protocol), for example a gigabyte ethernet connection, is used for quantum key generation, encrypted key transfer (e.g., E(K1+PK1, QKi), administration, and audit data (e.g., log files). A software and firmware loading interface 710 is used for loading software and/or firmware. A user interface 712 is used for switches and indicators. A power and grounding interface 714 is used for power supply and ground connections. An optical interface 716 is used for the quantum channel(s).

Figure 8:
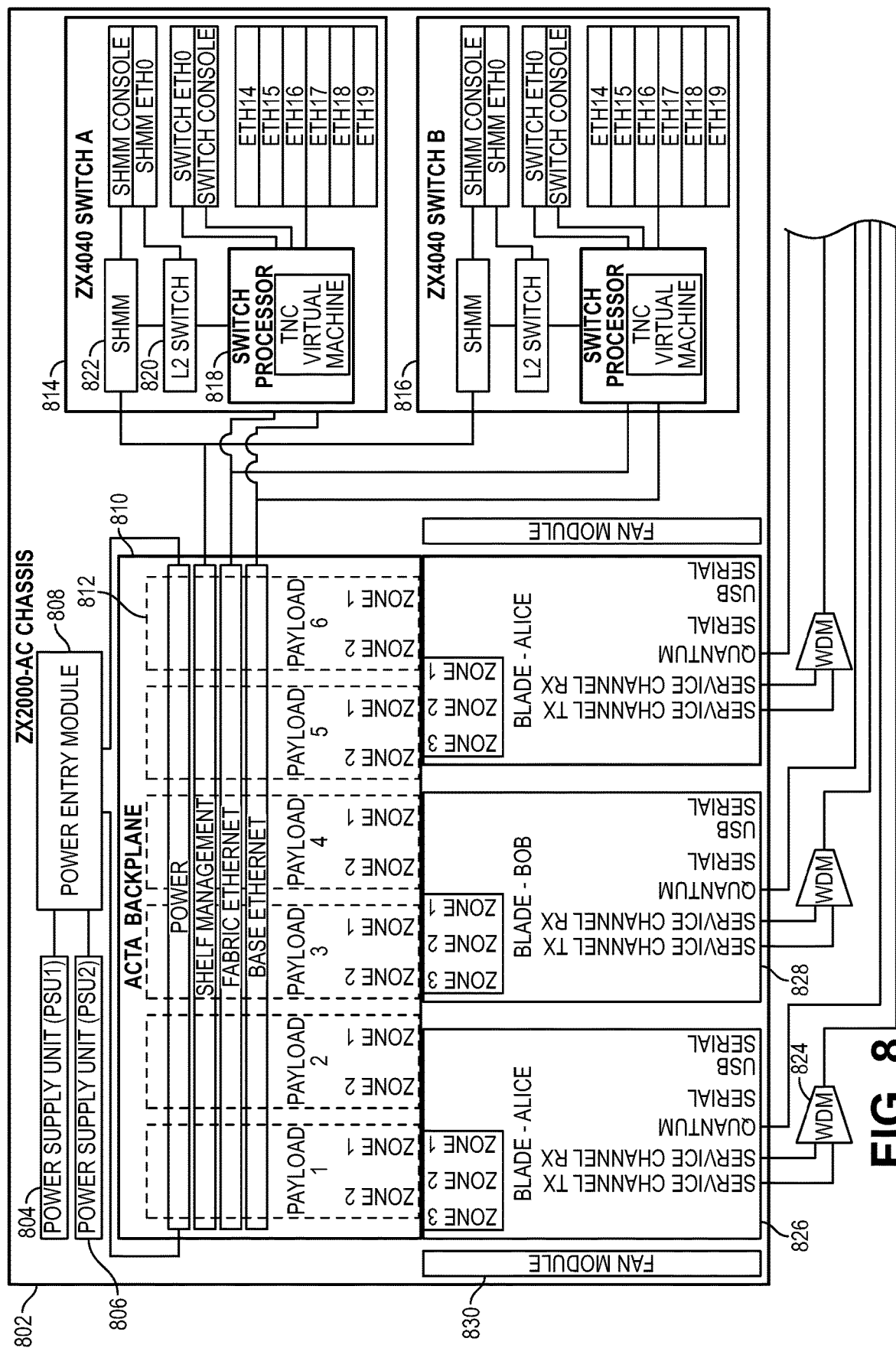
FIG. 8 depicts components in a Trusted Node, and various connections for power and communication.

FIG. 8 depicts components in a Trusted Node, and various connections for power and communication. A chassis 802 mounts the various components. Power supplies 804, 806 and a power entry module 808 provide power (and ground connection) for the various components. A backplane 810, for example an Advanced Telecommunication Computing Architecture (ATCA) backplane, holds the payloads 812 1-6. Each payload 812 includes memory that holds the shelf key encrypted data and couples to the blades 826, 828. One or more Alice blades 826 and one or more Bob blades 828 each have a service channel transmitter (Tx) and a service channel receiver (Rx), a Quantum port, a serial port and a USB serial port. A wavelength division multiplexer 824 connects to each of the paired service channel Tx and service channel RX of a blade. Switch A 814 and switch B 816 each have a SHMM 822, a layer 2 (L2) switch 820 and a switch processor 832. In this embodiment, the Trusted Node Controller is implemented as a virtual machine, the TNC virtual machine 818, in the switch processors 832 of the switches 814, 816. In some versions, this TNC virtual machine 818 is fault-tolerant, with the task processing and processes of the Trusted Node Controller flexibly assigned to and hosted by one, the other or both of the switch processors 832 (or more switch processors, in further embodiments) according to availability and functioning status of the processors and processes. One or more fan modules 830 provide air cooling for the system components.

Figure 9:
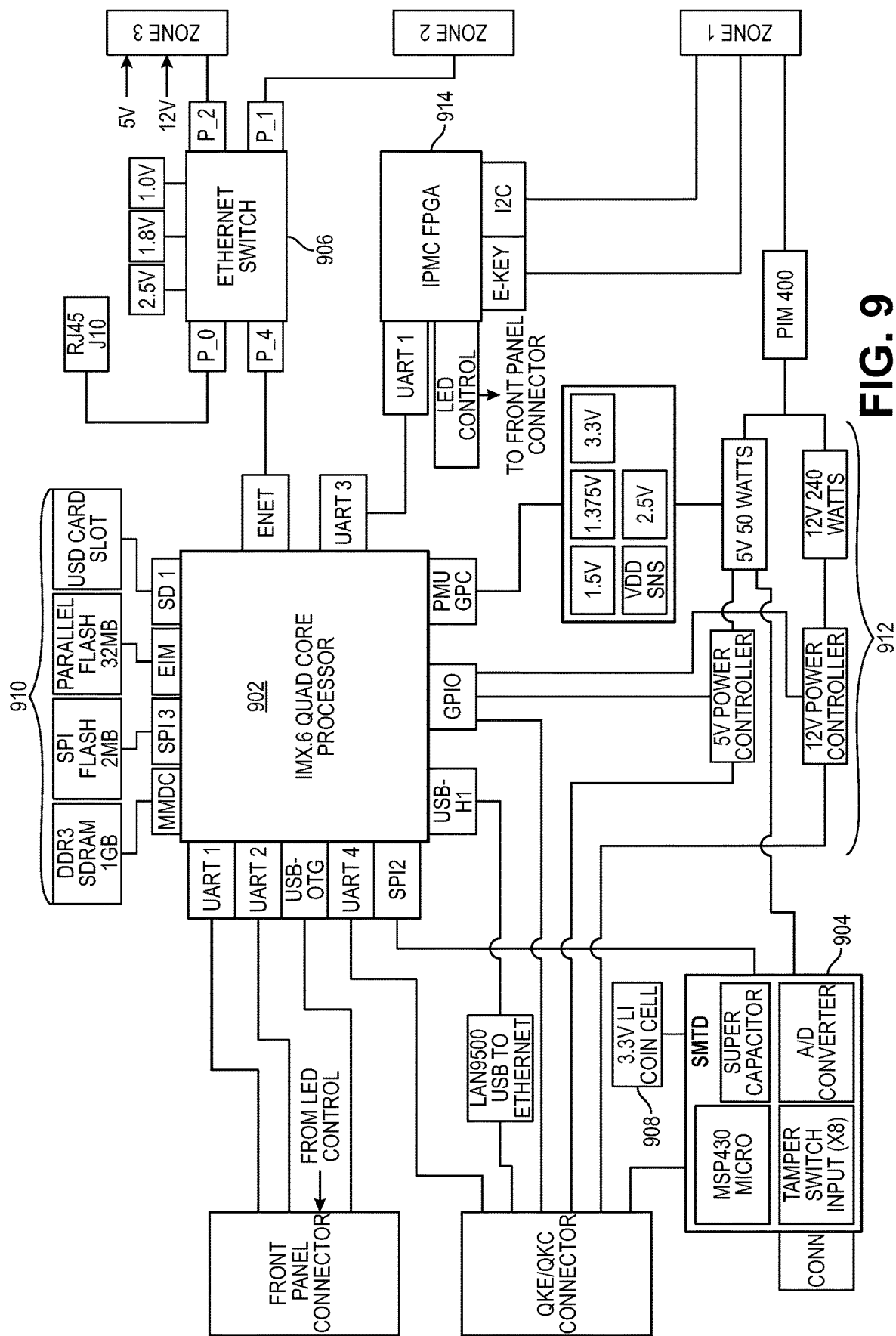
FIG. 9 is a block diagram of a Quantum Key Controller that can be used in embodiments of quantum blades as shown in FIG. 5.

FIG. 9 is a block diagram of a Quantum Key Controller that can be used in embodiments of quantum blades as shown in FIG. 5. A quad core processor 902, or other processor(s) in further embodiments, has various serial and parallel ports, multiple types of memory 910, for example DDR 3 SDRAM (double data rate, third generation, static dynamic random access memory), serial flash memory (for example SPI or serial peripheral interface), parallel flash memory, and a slot for memory cards, for example micro SD (Secure Digital). An ethernet switch 906 implements multiple ports for network connection. An FPGA (field programmable gate array) 914 implements various logic functions and may have one or more processors for various functions in software or firmware. Various power supplies 912 provide electrical power at various voltages. A secure memory tamper detection module 904 has a processor, a super capacitor, A/D (analog-to-digital) converter, and a tamper switch input. Various connectors are also included in the Quantum Key Controller.

Figure 10:
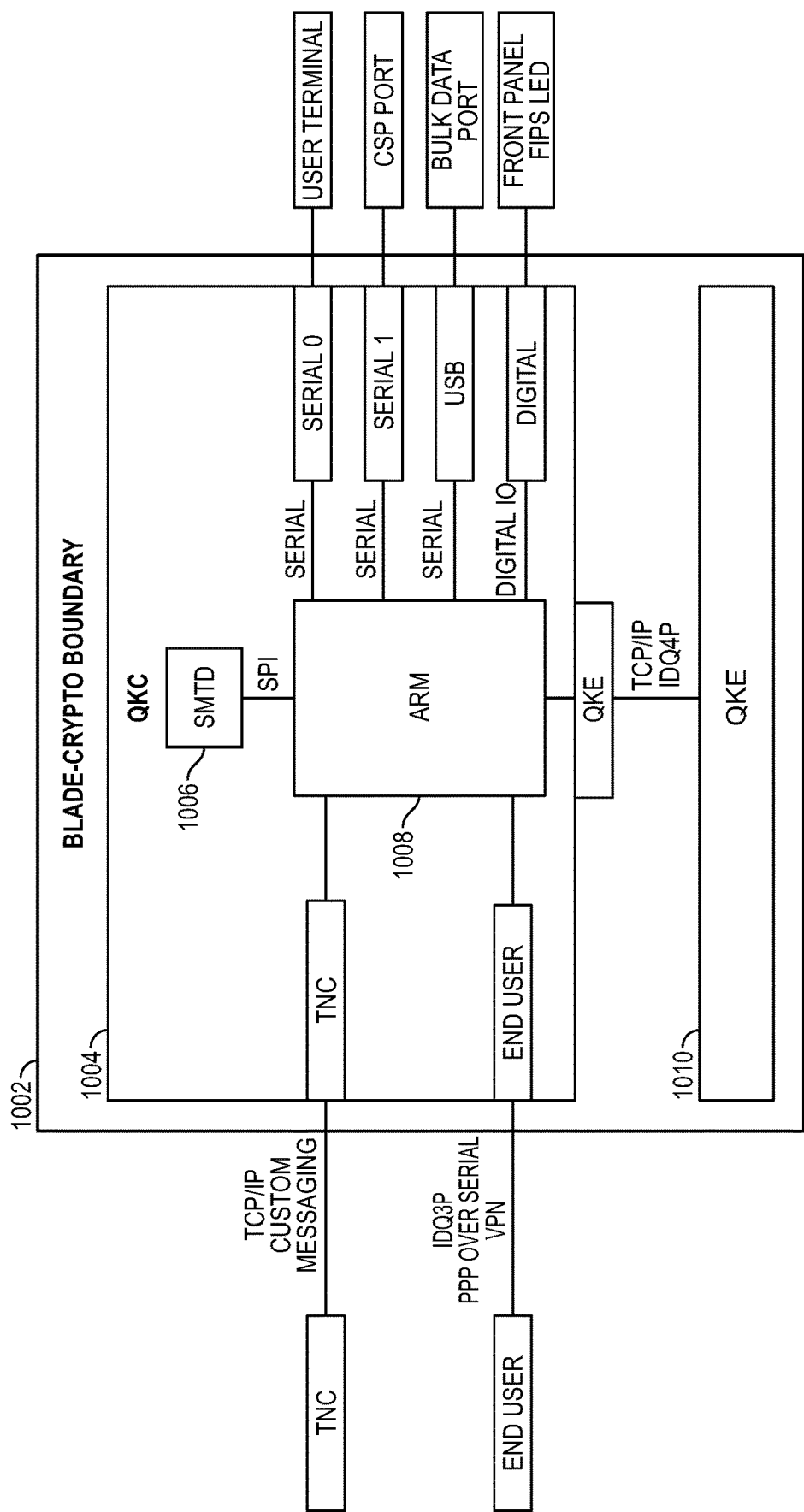
FIG. 10 depicts communication interfaces of a Quantum Key Controller and Quantum Key Engine in a quantum blade as shown in FIG. 5.

FIG. 10 depicts communication interfaces of a Quantum Key Controller 1004 and Quantum Key Engine 1010 in a quantum blade 1002, e.g., as shown in FIGS. 5A-5C. An ARM processor 1008 (or other processor(s) in various embodiments) communicates with the secure memory tamper detection module 1006 through an SPI interface, communicates with the Trusted Node Controller (TNC) through TCP/IP (transmission control protocol Internet protocol) and custom messaging, communicates with an end-user through PPP (point to point protocol) over serial VPN (virtual private network), and communicates with the quantum key exchange (QKE) module 1010 over TCP/IP. Serial interfaces support communication between the processor 1008 and a user terminal, a CSP port, and a bulk data port.

Figure 11:
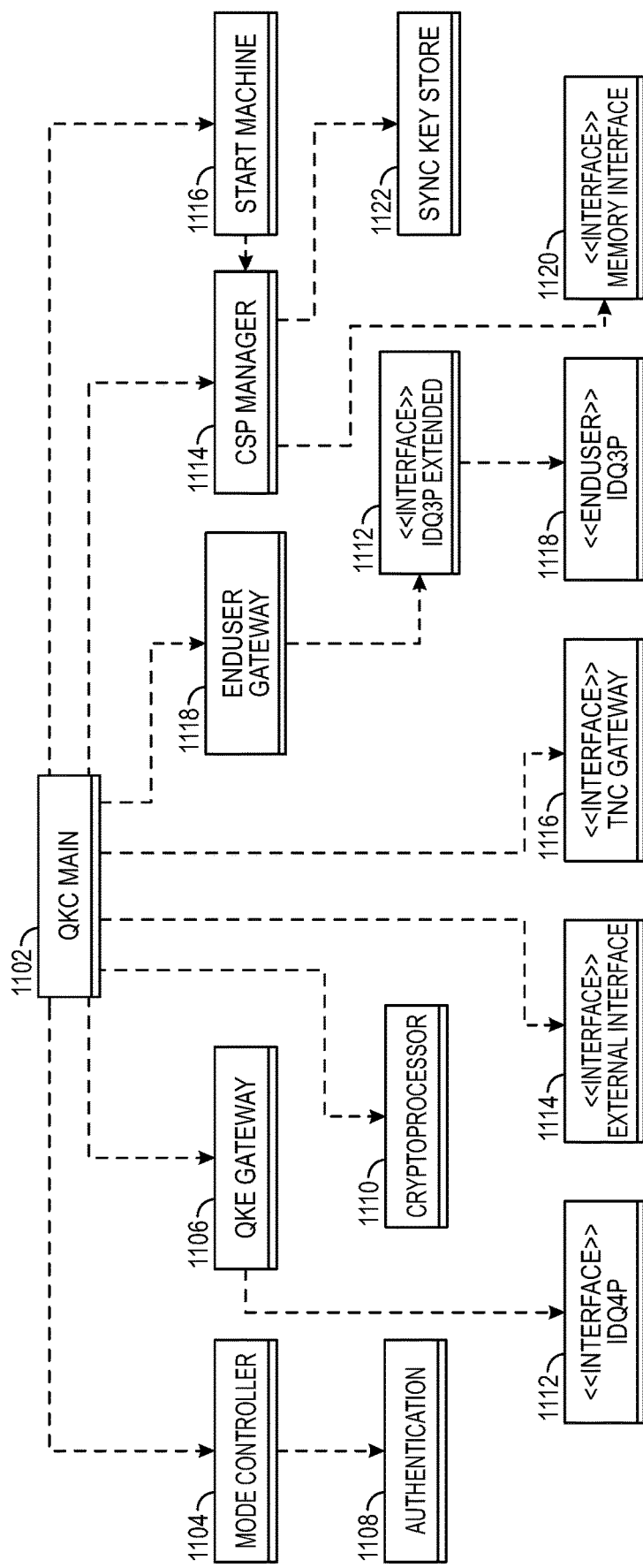
FIG. 11 depicts components of an embodiment of a Quantum Key Controller.

FIG. 11 depicts components of an embodiment of a Quantum Key Controller. These components may be implemented in software executing on one or more processors, firmware and/or hardware in various embodiments. A Quantum Key Controller main module 1102 coordinates the other modules. A mode controller module 1104 tracks and changes modes, and gives mode-specific direction. An authentication module 1108 allows user access to the modes through the mode controller module 1104. A crypto processor module 1110 implements functions of the crypto processor as described above. A Quantum Key Exchange gateway module 1106 manages communication between the Quantum Key Controller main module 1102 and the Quantum Key Exchange functions, through an interface module 1112. An external interface module 1114 manages communication between the Quantum Key Controller main module 1102 and one or more external interfaces. A Trusted Node Controller gateway module 1116 manages communication between the Quantum Key Controller main module 1102 and the Trusted Node Controllers on the quantum blades. An end user gateway module 1118 manages communication between the Quantum Key Controller main module 1102 and end-users, through an interface module 1112 and an end-user module 1118. A critical security parameters manager module 1114 manages critical security parameters, through a memory interface module 1120 and a synchronized key store module 1122. A state machine module 1116 tracks system states to inform the critical security parameters manager module 1114.

Figure 12:
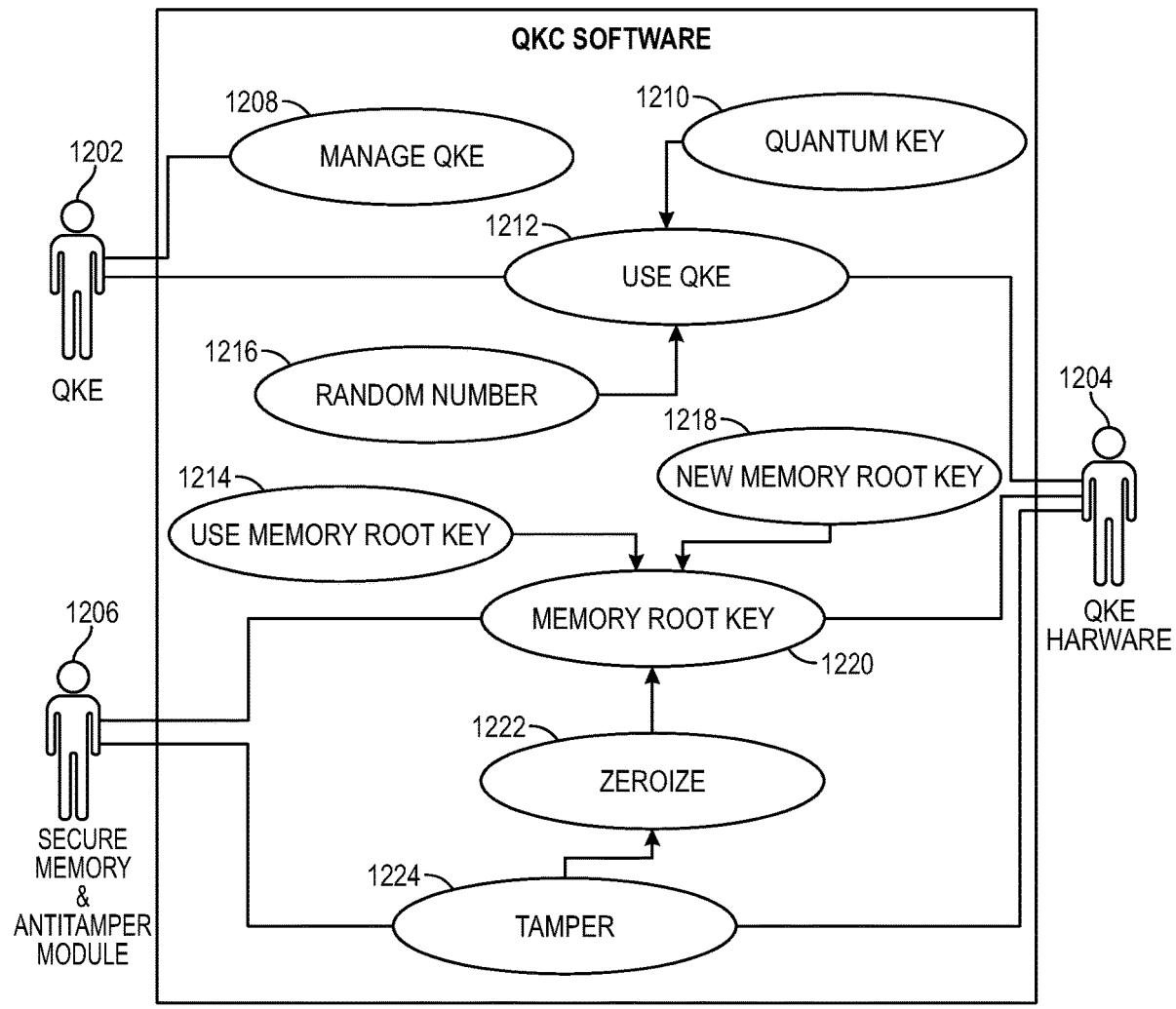
FIG. 12 depicts Quantum Key Controller use cases.

FIG. 12 depicts Quantum Key Controller use cases. These can be implemented in software executing on one or more processors, and/or firmware, in the Quantum Key Controller. In FIG. 12, various modules and associated processes are represented as human figures, to indicate applicability of user input to those modules and processes. The Quantum Key Exchange 1202 module has access to the manage QKE process 1208 and the use QKE process 1212, which uses the quantum key process 1210 and the random number process 1216. Quantum Key Controller hardware 1204 has access to and use of the QKE process 1212, the memory root key process 1220 and the tamper process 1224. Secure memory and anti-tamper module 1206 also has access to the memory root key module 1220 and the tamper process 1224. The tamper process 1224 uses the zeroize process 1222, which affects the memory root key process 1220. The memory root key process 1220 can use the use memory root key process 1214, or the new memory root key process 1218.

Figure 13A:
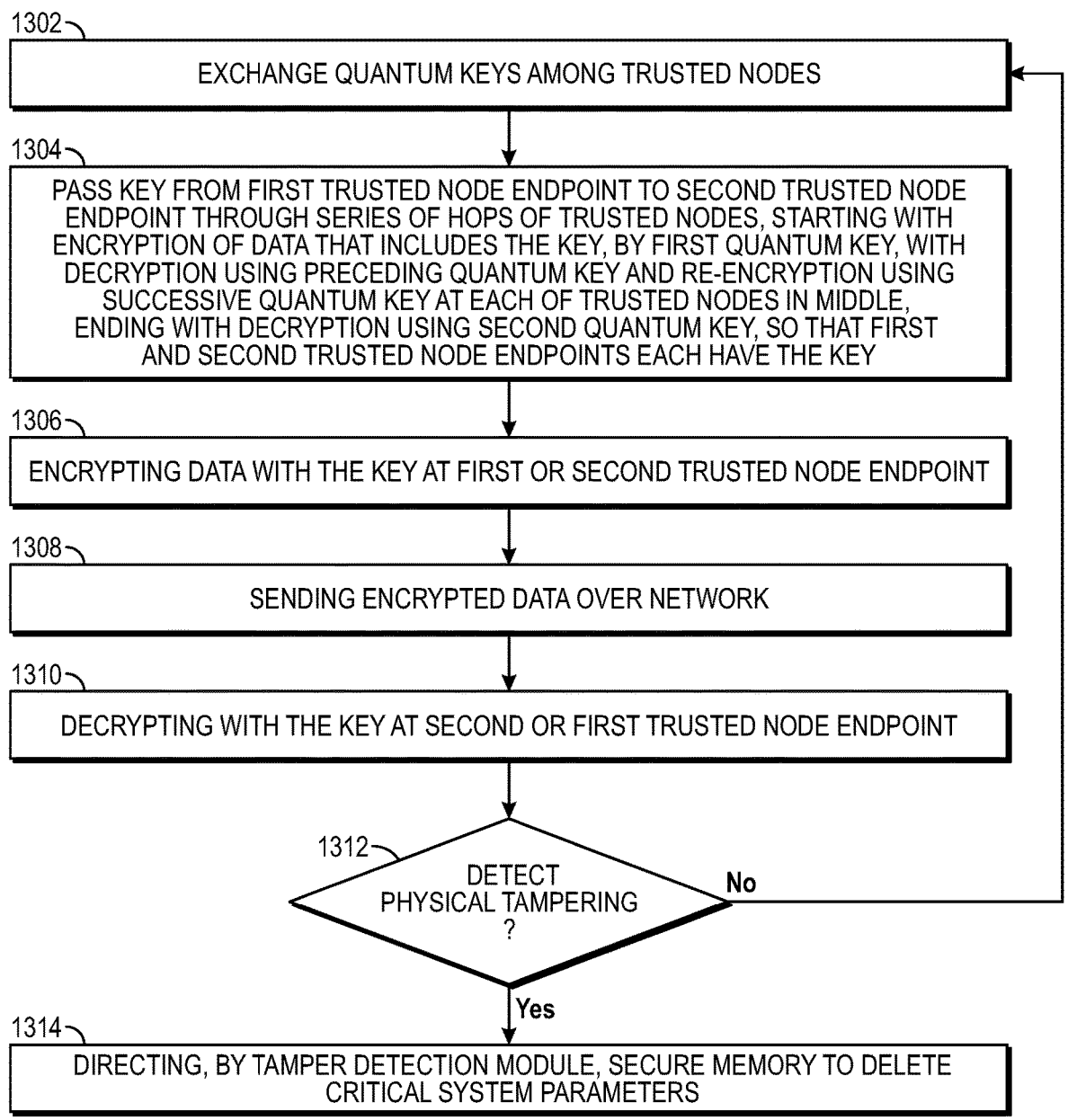
FIG. 13A is a flow diagram of a method of operating a tamper detecting quantum key distribution system, which can be practiced on or by present embodiments.

FIG. 13A is a flow diagram of a method of operating a tamper detecting quantum key distribution system, which can be practiced on or by present embodiments. The method can be practiced by one or more processors in trusted nodes.

In an action 1302, quantum keys are exchanged among trusted nodes.

In an action 1304, a key is passed from the first trusted node endpoint to the second trusted node endpoint through a series of hops of trusted nodes. The key passing starts with encryption of data that includes the key, with the encryption performed by the first quantum key. Next, there is decryption using a preceding quantum key, and re-encryption using a successive quantum key at each of the trusted nodes in the middle of the quantum key distribution system. The key passing ends with decryption, using the second quantum key, so that the first and second trusted node endpoint teach have the key that started from the first trusted node endpoint.

In an action 1306, data is encrypted with the key, at the first or the second trusted node endpoint.

In an action 1308, the encrypted data is sent over a network, from the first trusted node endpoint to the second trusted node endpoint or vice versa.

In an action 1310, the encrypted data is decrypted with the key, at the second or first trusted node endpoint. For example, if the data was encrypted at the first trusted node endpoint, and sent to the second trusted node endpoint over the network, the data is then decrypted at the second trusted node endpoint. Or, if the data was encrypted at the second trusted node endpoint, and sent to the first trusted node endpoint over the network, the data is then decrypted at the first trusted node endpoint. Encryption and decryption at the endpoints are possible because both of the endpoint trusted nodes have the key, which was passed through the series of hops of trusted nodes.

Figure 13B:
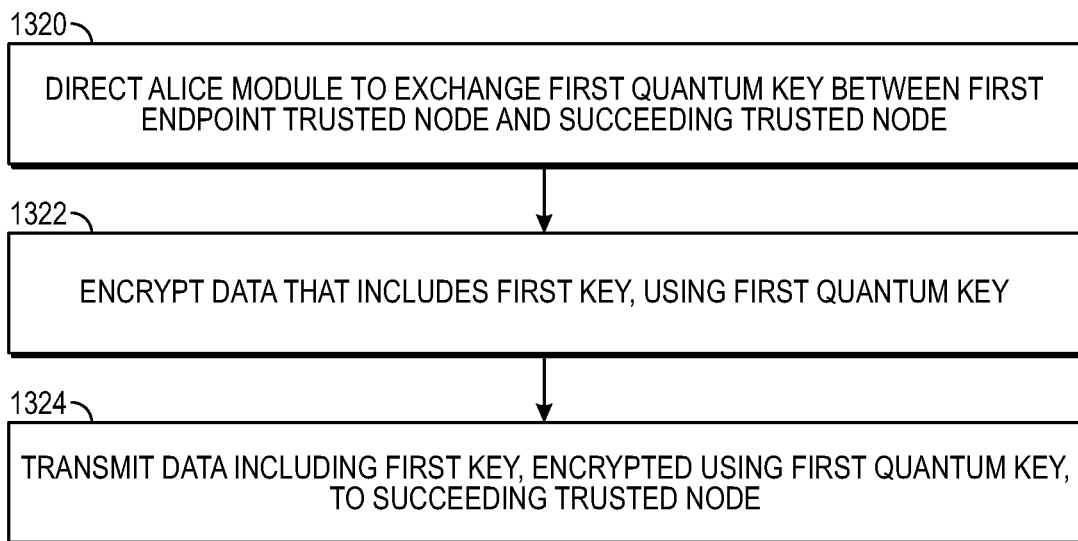
FIG. 13B is a flow diagram of a method of operating a trusted node of a quantum key distribution system, which can be practiced on or by present embodiments, specifically by an endpoint trusted node or trusted node operating as an endpoint.

FIG. 13B is a flow diagram of a method of operating a trusted node of a quantum key distribution system, which can be practiced on or by present embodiments, specifically by an endpoint trusted node or trusted node operating as an endpoint. The method can be practiced by one or more processors in a trusted node.

In an action 1320, an Alice module in the first endpoint trusted node is directed to exchange a first quantum key between the first endpoint trusted node and the succeeding trusted node.

In an action 1322, data that includes the first key is encrypted, using the first quantum key. The data that includes the first key could be the first key itself, in plaintext or unencrypted form, the first key encrypted or wrapped by another key, the first key XOR or otherwise combined with another key or data, or another form that includes the first key.

In an action 1324, the data including the first key, with the data encrypted using the first quantum key, is transmitted to the succeeding trusted node. The data encrypted using the first quantum key can be transmitted over a network. These actions start the key passing from one endpoint trusted node, in this case called the first endpoint trusted node, over a series of hops through middle-trusted nodes, to another endpoint trusted node, in this case called the second endpoint trusted node.

Figure 13C:
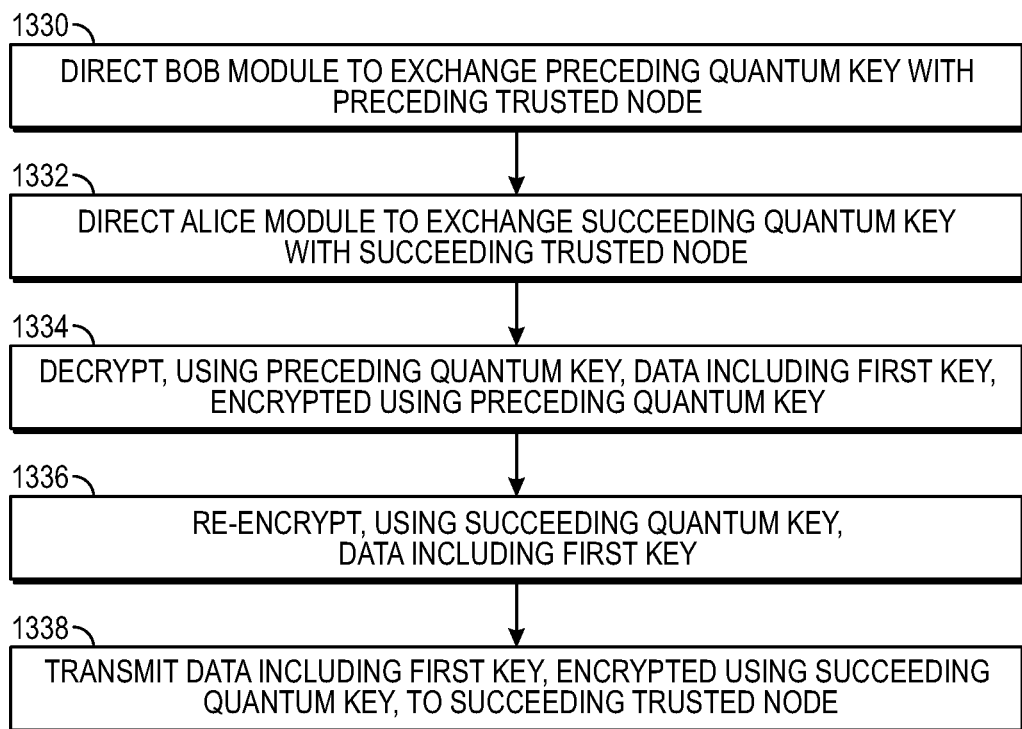
FIG. 13C is a flow diagram of a method of operating a trusted node of a quantum key distribution system, which can be practiced on or by present embodiments, specifically by a middle-trusted node or trusted node operating as a trusted node in the middle of a quantum key distribution system.

FIG. 13C is a flow diagram of a method of operating a trusted node of a quantum key distribution system, which can be practiced on or by present embodiments, specifically by a middle-trusted node or trusted node operating as a trusted node in the middle of a quantum key distribution system. The method can be practiced by one or more processors in a trusted node.

In an action 1330, a Bob module in the trusted node is directed to exchange a preceding quantum key with a preceding trusted node (i.e., exchange a quantum key with the trusted node that precedes the present trusted node).

In an action 1332, an Alice module in the trusted node is directed to exchange a succeeding quantum key with a succeeding trusted node (i.e., exchange a quantum key with the trusted node that succeeds or follows the present trusted node). The quantum keys in actions 1330 and 1332 are distinct from each other.

In an action 1334, the trusted node decrypts data including the first key, where the data was encrypted in the preceding trusted node using the preceding quantum key. The decryption in the trusted node uses the preceding quantum key.

In an action 1336, the trusted node re-encrypts the data that includes the first key. The re-encryption is performed using the succeeding quantum key.

In an action 1338, the data that includes the first key, encrypted using the succeeding quantum key, is transmitted to the succeeding trusted node. These actions perform a decryption, re-encryption hop for passing the first key from one trusted node to the next trusted node in a series of hops. The decryption and re-encryption, at a given trusted node, use different quantum keys.

Figure 13D:
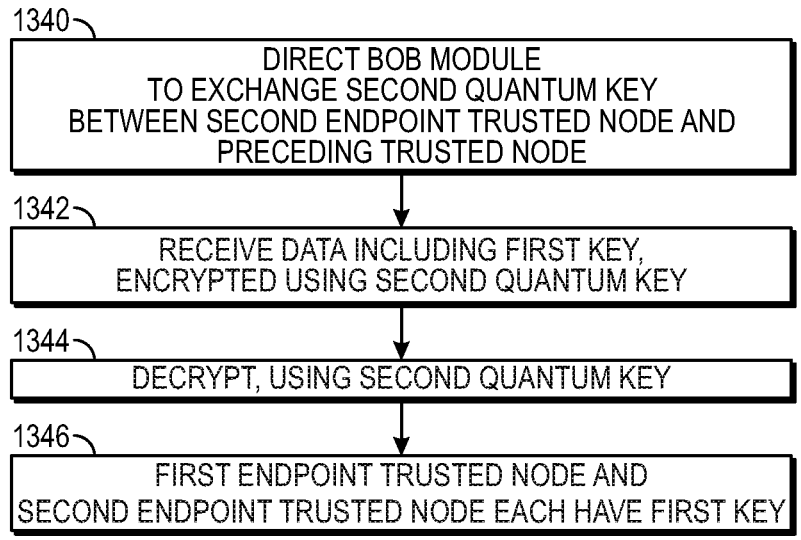
FIG. 13D is a flow diagram of a method of operating a trusted node of a quantum key distribution system, which can be practiced on or by present embodiments, specifically by an endpoint trusted node or trusted node operating as an endpoint.

FIG. 13D is a flow diagram of a method of operating a trusted node of a quantum key distribution system, which can be practiced on or by present embodiments, specifically by an endpoint trusted node or trusted node operating as an endpoint. The method can be practiced by one or more processors in a trusted node.

In an action 1340, a Bob module in the second endpoint trusted mode is directed to exchange a second quantum key between the second endpoint trusted node and the preceding trusted node (relative to the second endpoint trusted node).

In an action 1342, data including the first key, with the data encrypted using the second quantum key, is received by the second endpoint trusted node.

In an action 1344, the data that includes the first key, with the data being encrypted by using the second quantum key, is decrypted, using the second quantum key.

In an action 1346, after recovery of the first key from the now decrypted data that includes the first key, the first endpoint trusted node and the second endpoint trusted node each have the first key. These actions complete the passing of the first key from the first trusted endpoint node to the second endpoint trusted node.

Once both endpoint trusted nodes have the first key, each of these endpoint trusted nodes can encrypt and decrypt, using the first key, and can communicate over a network with each other to send and receive data encrypted using the first key. Significantly, the data encrypted using the first key can go directly over a network from the first trusted node endpoint to the second trusted node endpoint, or from the second trusted node endpoint to the first trusted node endpoint (see FIG. 1C encrypted data communicated between two endpoints), without having to undergo the hops through the middle-trusted nodes as did the transmission of the first key (see FIG. 1C transmission of K1).

Figure 13E:
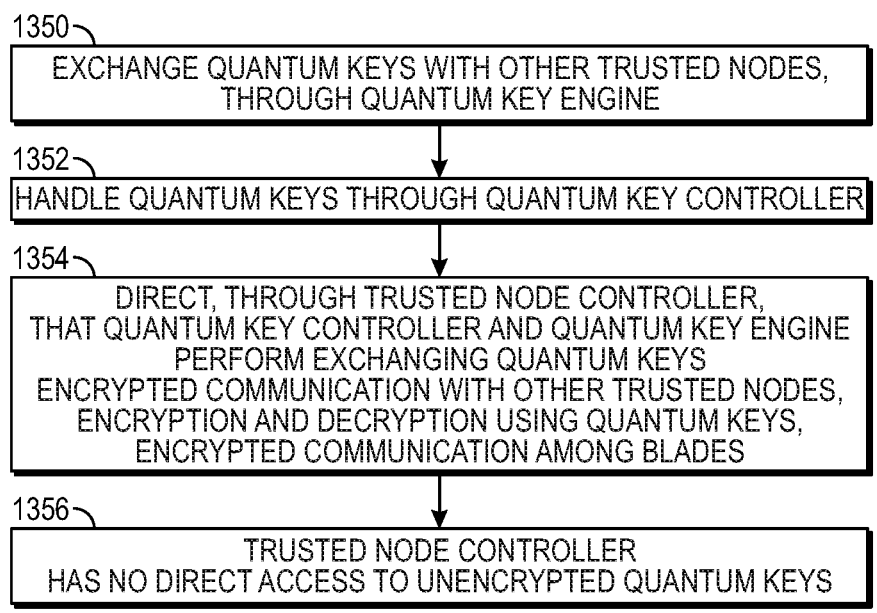
FIG. 13E is a flow diagram of a method of operating a trusted node for quantum key distribution, which can be practiced on or by present embodiments.

FIG. 13E is a flow diagram of a method of operating a trusted node for quantum key distribution, which can be practiced on or by present embodiments. The method can be practiced by one or more processors in a trusted node.

In an action 1350, quantum keys are exchanged with other trusted nodes, by the trusted node, through the quantum key engine of the trusted node.

In an action 1352, quantum keys are handled through the quantum key controller of the trusted node.

In an action 1354, the trusted node directs, through the trusted node controller, that the quantum key controller and the quantum key engine perform the exchanging of quantum keys, encrypted communication with other trusted nodes, encryption and decryption using quantum keys, and encrypted communication among blades of the trusted node controller.

In an action 1356, the trusted node controller has no direct access to unencrypted quantum keys. Actions 1350, 1352, 1354 have the trusted node controller directing the quantum key controller and the quantum key engine to create, access and use the quantum keys for encryption and decryption, so that the trusted node controller has a director or supervisory role, but the trusted node controller does not directly access the unencrypted quantum keys.

The processor(s) of the trusted node controller cannot and do not read, write, send nor receive an unencrypted quantum key. No unencrypted quantum key is accessible to the trusted node controller, as a result of defined security boundary or cryptographic boundary, enforced and implemented by software, hardware and system architecture.

The various embodiments of quantum key distribution systems, quantum key encryption systems, and quantum key distribution systems greatly extend the distance over which quantum key distribution and quantum communication can take place. These systems improve security of data, security of keys, and secure communications. Various embodiments can have various combinations of features described herein.

What is claimed is:

1. A quantum communication system, comprising:
   a plurality of trusted nodes, each having a quantum key controller with at least a quantum transmitter or a quantum receiver;
   two of the plurality of trusted nodes configurable as first and second endpoint trusted nodes, remaining ones of the plurality of trusted nodes configurable as middle-trusted nodes between the endpoint trusted nodes;
   the first endpoint trusted node to encrypt data comprising a first key, using a first quantum key exchanged between the first endpoint trusted node and a first one of the middle-trusted nodes, and transmit the first quantum key encrypted data comprising the first key over a network to the first one of the middle-trusted nodes;
   each of the middle-trusted nodes to decrypt, using a preceding quantum key exchanged between a preceding trusted node and the middle-trusted node, preceding quantum key encrypted data comprising the first key, re-encrypt the data comprising the first key using a succeeding quantum key exchanged between the middle-trusted node and a succeeding trusted node, and transmit over the network the succeeding key encrypted data comprising the first key to the succeeding trusted node; and
   the second endpoint trusted node to receive over the network and decrypt the preceding quantum key encrypted data comprising the first key, using a second quantum key exchanged between a second one of the middle-trusted nodes and the second endpoint trusted node, to obtain the first key, so that the first and second endpoint trusted nodes each has the first key.

2. The quantum communication system of claim 1, further comprising:
   the first or second endpoint trusted node to encrypt data using the first key, and transmit over the network or a further network the data encrypted using the first key; and
   the second or first endpoint trusted node to receive over the network the data encrypted using the first key, and decrypt using the first key to obtain the data.

3. The quantum communication system of claim 1, further comprising:
   the first endpoint trusted node and the second endpoint trusted node to exchange a first public key;
   the first endpoint trusted node to combine the first key with the first public key to produce the data comprising the first key; and
   the second endpoint trusted node to extract, using the first public key, the first key from the data comprising the first key, to obtain the first key.

4. The quantum communication system of claim 1, further comprising:
   the first and second endpoint trusted nodes to exchange a second public key, encrypt and decrypt data using the first key and the second public key, and transmit and receive data encrypted using the first key and the second public key over the network or a further network.

5. The quantum communication system of claim 1, further comprising:
   the first endpoint trusted node having a quantum random number generator, to use in producing the first key.

6. The quantum communication system of claim 1, further comprising:
   the first and second endpoint trusted nodes to encrypt and decrypt, and send and receive over the network or a further network, encrypted data comprising data encrypted by the first key XOR a second public key.

7. The quantum communication system of claim 1, wherein the data comprising the first key comprises the first key XOR a first public key.

8. A quantum key distribution system, comprising:
   a plurality of trusted nodes, each having a quantum key controller with at least a quantum transmitter or a quantum receiver;

a first endpoint trusted node and a second endpoint trusted node, of the plurality of trusted nodes, to exchange a first public key with each other;

the first endpoint trusted node to transmit a first quantum key over a first quantum channel to a first middle-trusted node, that is one of one or more middle-trusted nodes of the plurality of trusted nodes between the first endpoint trusted node and the second endpoint trusted node;

the first endpoint trusted node to combine a first key with the first public key to form a once encrypted key, encrypt the once encrypted key with a quantum enhanced key based on the first quantum key to form a twice encrypted key, and transmit the twice encrypted key over a network to the first middle-trusted node;

each of the one or more middle-trusted nodes to receive a quantum key over a quantum channel from a preceding trusted node and transmit a further quantum key over a further quantum channel to a following trusted node, receive a corresponding twice encrypted key over the network from the preceding trusted node, decrypt the corresponding twice encrypted key with the quantum key to form the once encrypted key, re-encrypt the once encrypted key with the further quantum key to form a further twice encrypted key, and transmit the further twice encrypted key over the network to the following trusted node; and the second endpoint trusted node to receive the further quantum key over the further quantum channel from a final one of the middle-trusted nodes, receive the twice encrypted key over the network from the final middle-trusted node, decrypt the twice encrypted key with the further quantum key to form the once encrypted key, and extract, using the first public key, the first key from the once encrypted key, so that the first endpoint trusted node and the second endpoint trusted node each has the first key.

9. The quantum key distribution system of claim 8, further comprising:
the first endpoint trusted node and the second endpoint trusted node to exchange a second public key with each other;
one of the first endpoint trusted node and the second endpoint trusted node to encrypt data with a key based on the first key and the second public key, and transmit the encrypted data over the network or a further network to an opposing one of the first endpoint trusted node and the second endpoint trusted node; and
the opposing one of the first endpoint trusted node and the second endpoint trusted node to receive the encrypted data and decrypt the encrypted data with the key based on the first key and the second public key, to obtain the data.

10. The quantum key distribution system of claim 8, further comprising:
the first endpoint trusted node and the second endpoint trusted node to exchange a second public key with each other;
each of the first endpoint trusted node and the second endpoint trusted node to form a further key, for encrypting and decrypting data, from the first key XOR the second public key.

11. The quantum key distribution system of claim 8, further comprising:
each of the plurality of trusted nodes having a quantum random number generator, to use in creating keys.

12. The quantum key distribution system of claim 8, further comprising:
the first and second endpoint trusted nodes to exchange a second public key with each other; and
the first and second endpoint trusted nodes to encrypt and decrypt, and send and receive over the network or a further network, encrypted data comprising data encrypted by the first key XOR the second public key.

13. The quantum key distribution system of claim 8, further comprising:
the first endpoint trusted node to XOR the first key with the first public key to form the once encrypted key.

14. A component for a quantum communication system, comprising:
a trusted node, configurable as each of a first endpoint trusted node, a middle-trusted node, and a second endpoint trusted node, and having a quantum key controller, wherein a plurality of such trusted nodes configured as the first endpoint trusted node, the second endpoint trusted node and one or more middle-trusted nodes are able to form the quantum communication system;

the quantum key controller, with the trusted node as the first endpoint trusted node, to direct a quantum transmitter to exchange a first quantum key between the trusted node and a trusted node that succeeds the first endpoint trusted node, to encrypt data comprising a first key using the first quantum key and transmit the data comprising the first key encrypted using the first quantum key to the trusted node that succeeds the first endpoint trusted node over a network;

the quantum key controller, with the trusted node as the middle-trusted node, to direct a quantum receiver to exchange a preceding quantum key with a trusted node that precedes the middle-trusted node and direct a quantum transmitter module to exchange a succeeding quantum key with a trusted node that succeeds the middle-trusted node, to decrypt, using the preceding quantum key, the data comprising the first key encrypted using the preceding quantum key, re-encrypt, using the succeeding quantum key, the data comprising the first key and transmit the data comprising the first key encrypted using the succeeding quantum key to a trusted node that succeeds the middle-trusted node over the network; and the quantum key controller, with the trusted node as the second endpoint trusted node, to direct a quantum receiver to exchange a second quantum key with a trusted node that precedes the second endpoint trusted node, to receive from the network and decrypt, using the second quantum key, the data comprising the first key encrypted using the second quantum key and obtain the first key, so that the first endpoint trusted node and the second endpoint trusted node each have the first key.

15. The component for a quantum communication system of claim 14, further comprising:
the trusted node as the first or second endpoint trusted node to encrypt data using the first key, and transmit over the network or a further network the data encrypted using the first key; and
the trusted node as the second or first endpoint trusted node to receive over the network the data encrypted using the first key, and decrypt using the first key to obtain the data.

16. The component for a quantum communication system of claim 14, further comprising:

the trusted node as the first or second endpoint trusted node to exchange a first public key with another trusted node configured as the second or the first endpoint trusted node, and combine the first key with the first public key to produce the data comprising the first key, or extract, using the first public key, the first key from the data comprising the first key, to obtain the first key.

17. The component for a quantum communication system of claim 14, further comprising:
the trusted node as the first or second endpoint trusted node to exchange a second public key with another trusted node configured as the second or the first endpoint trusted node, and encrypt data using the first key and the second public key for transmission over the network or a further network, or decrypt, using the first key and the second public key, data that is encrypted using the first key and the second public key and received over the network or the further network.

18. The component for a quantum communication system of claim 14, further comprising:
the trusted node as the first endpoint trusted node to produce the first key using a quantum random number generator.

19. The component for a quantum communication system of claim 14, further comprising:
the trusted node as the first or second endpoint trusted node to encrypt and decrypt, and send and receive over the network or a further network, encrypted data comprising data encrypted by the first key XOR a second public key.

20. The component for a quantum communication system of claim 14, further comprising:
the trusted node as the first endpoint trusted node to XOR the first key with a first public key to produce the data comprising the first key; and
the trusted node as the second endpoint trusted node to XOR the data comprising the first key with the first public key to obtain the first key from the data comprising the first key.

* * * * *